(12) United States Patent
Koike

(10) Patent No.: US 7,842,740 B2
(45) Date of Patent: Nov. 30, 2010

(54) NON-BIREFRINGENT OPTICAL RESIN MATERIAL AND OPTICAL MEMBER

(76) Inventor: Yasuhiro Koike, 534-23, Ichigao-cho, Aoba-ku, Yokohama-shi, Kanagawa 225-0024 (JP)

( * ) Notice: Subject to any disclaimer, the term of this patent is extended or adjusted under 35 U.S.C. 154(b) by 457 days.

(21) Appl. No.: 11/919,387

(22) PCT Filed: Apr. 18, 2006

(86) PCT No.: PCT/JP2006/308152

§ 371 (c)(1),
(2), (4) Date: Oct. 26, 2007

(87) PCT Pub. No.: WO2006/118027

PCT Pub. Date: Nov. 9, 2006

(65) Prior Publication Data

US 2009/0306321 A1    Dec. 10, 2009

(30) Foreign Application Priority Data

Apr. 26, 2005    (JP) .............................. 2005-128410

(51) Int. Cl.
G02B 6/00    (2006.01)
G02F 1/00    (2006.01)
(52) U.S. Cl. .................... 524/81; 526/245; 526/937; 349/120; 385/141
(58) Field of Classification Search ................ 524/81; 526/245, 937; 349/120; 385/141
See application file for complete search history.

(56) References Cited

U.S. PATENT DOCUMENTS 5,858,499 A * 1/1999 Abe et al. ................... 428/64.7
6,352,761 B1 * 3/2002 Hebrink et al. .............. 428/212

FOREIGN PATENT DOCUMENTS

JP    401101327 A  *  4/1989
JP    8-110402        4/1996
JP    2001-318202    11/2001

OTHER PUBLICATIONS

International Preliminary Report on Patentability issued in corresponding International Patent Application No. PCT/JP2006/308152, mailed on Nov. 8, 2007.

Shuichi Iwata et al., "Transparent zero-birefringence copolymer and its optical properties", Applied Optics, vol. 36, No. 19, Jul. 1, 1997; pp. 4549-4555.

H. Ohkita et al., "Compensation of the photoelastic birefringence of a polymer by doping with an anisotropic molecule", Applied Physics A.81, (2005); pp. 617-620.

Akihiro Tagaya et al., "Anisotropic Molecule Dopant Method for Synthesizing a Zero-Birefringent Polymer", Japanese Journal of Applied Physics, vol. 40, Part 1, No. 10, Oct. 2001; pp. 6117-6123.

Shuichi Iwata et al., "Compensation for Birefringence of Oriented Polymers by Random Copolymerization Method", Japanese Journal of Applied Physics, vol. 35, Part 1, No. 7, Jul. 1996; pp. 3896-3901.

Hisanori Ohkita et al., "Compensation of Photoelastic Birefringence of Polymers by Anisotropic Molecules and Analysis of Compensation Mechanism", Japanese Journal of Applied Physics, vol. 44, No. 6A, 2005; pp. 3975-3982.

Akihiro Tagaya et al., "Zero-birefringence polymer by the anisotropic molecule dope method", Applied Optics, vol. 40, No. 22, Aug. 1, 2001; pp. 3677-3683.

English language version of the International Search Report (PCT/ISA/210) mailed on Jul. 25, 2006 for the International Application PCT/JP2006/308152.

* cited by examiner

Primary Examiner—Tae H Yoon
(74) Attorney, Agent, or Firm—Staas & Halsey LLP

(57) ABSTRACT

Provided are an optical resin and an optical member using the same, both orientation birefringence and photoelasticity birefringence of the optical material being deadened and generally eliminated. The optical material consists of a composite constituent system of three or more constituents including a copolymerization system of monomer-element number not smaller than two, combination and constituent ratio of the composite constituent system being set so that both orientation birefringence and photoelasticity birefringence of the optical material are deadened at the same time and $5.0 \times 10^{-5}$ or less is given under a condition that principal chains of the copolymerization system have degree of orientation equal to 0.03, and further a photoelasticity constant not greater than $1.0 \times 10^{-12}$ ($Pa^{-1}$) is obtained. The composite constituent system may contain an additive containing a low molecular weight compound which has an anisotropic polarizability and can be orientated in a polymer. The composite constituent system may consist of a copolymerization system of monomer-element number not smaller than three. Optical members produced by applying molding to the optical hardly show birefringence if external force is applied.

6 Claims, 8 Drawing Sheets

P(MMA/3FMA)

P(MMA/BzMA)

NON-BIREFRINGENT OPTICAL RESIN MATERIAL AND OPTICAL MEMBER

CROSS REFERENCE TO RELATED APPLICATIONS

This application claims the benefit under 35 U.S.C. Section 371, of PCT International Application Number PCT/JP2006/308152, filed Apr. 18, 2006 and Japanese Application No. 2005-128410, filed Apr. 26, 2005 in Japan, the contents of which are incorporated herein by reference.

FIELD OF INVENTION

The present invention relates to an optical resin (optical polymer) showing orientation birefringence and photoelasticity birefringence both of which are extremely small, and to application of the resin to an optical member (such as optical element or optical component).

BACKGROUND

Light permeable resin, generally called "optical れ しn" or "optical polymer" is employed as a material for film-like, plate-like, lens-like or other optical member used in various optical apparatuses (for example, film, substrate, prism sheet or the like used in liquid crystal displays; lenses in lens system for signal reading of optical disk; fresnel lens or lenticular lens or the like for projection screen).

Birefringence is one of important optical characteristics to be considered when an optical member is formed of an optical resin. That is, it is generally undesirable that an optical member has a large birefringence. Specifically, in the usages as exemplarily referred to as above (liquid crystal displays, optical disk device, projection screen), any film, lens or the like arranged in a light path gives bad influence on image quality or signal reading performance, and accordingly an optical member showing birefringence as small as possible is demanded. Doubtlessly, small birefringence is desirable for lenses for cameras, glasses or the likes.

Any way, as well-known in the field, birefringence of optical polymer (called simply "polymer" hereafter as required) includes birefringence caused mainly due to orientation of principal chains, namely "orientation birefringence", and birefringence caused mainly due to stress, namely "photoelasticity birefringence" (usually called simply "photoelasticity"). Orientation birefringence and photoelasticity birefringence have signs, respectively, each of which depends on chemical structure of polymer and is characteristic of individual polymer.

In other words, orientation birefringence generally appears when principal chains of chain-like polymer (polymer chains) are orientated, and this orientation of principal chains is generated in drawing or extruding molding process for producing polymer film, or injection molding process frequently employed for producing optical members of various shapes, namely in processes involving material flowing, and the generated birefringence remains in an optical member.

On the other hand, photoelasticity birefringence is birefringence which is caused by an elastic deformation (distortion) of polymer. An elastic deformation (distortion) remains in an optical member formed of polymer when any elastic deformation (distortion) is generated, for example, in the material by volume shrinkage involved by temperature reduction from a temperature about the glass transition temperature to another temperature lower than the glass transition temperature, providing cause of characteristic orientation birefringence.

Further, if an optical member is mounted, for example, to an optical device used in normal, temperature (lower then the glass transition temperature), any external force applied thereto also causes the material to be deformed elastically, thereby bringing photoelasticity birefringence.

As known well, movement of principal chains of optical polymer is generally frozen even if any elastic deformation occurs under a temperature not higher than the glass transition temperature, and orientation state of the principal chains are kept substantially unchanged. Therefore, it will can be say that photoelasticity birefringence emerges based on mechanism different from that based on which orientation birefringence merges, viewed from microscopic or molecule-level points, As known well, orientation birefringence and photoelasticity birefringence have signs, respectively, and some kinds of polymers show orientation birefringence and photoelasticity birefringence signs of which are inverse to each other (i.e. orientation birefringence of plus-sign and photoelasticity birefringence of minus-sign, or orientation birefringence of minus-sign and photoelasticity birefringence of plus), which suggests that there is で difference between emerging mechanism of orientation birefringence and that of photoelasticity birefringence.

As described above, orientation birefringence and photoelasticity birefringence emerge based on different mechanism, and orientation birefringence and photoelasticity birefringence shown by conventional optical resins are various, but it is difficult to find an optical resin showing orientation birefringence and photoelasticity birefringence both of which are sufficiently small.

For example, although polycarbonate and polystyrene are low-cost and have high transparency and high refractive index, they show orientation birefringence and photoelasticity birefringence both of which are large, bringing a disadvantage.

Theoretically saying, orientation birefringence does not emerge if no orientation is involved by production processes of an optical member including a molding process applied to an optical resin. Actually, prior arts have tried improving various conventional molding methods in order to reduce orientation birefringence by suppressing orientation of polymer intensively as possible in cases of molding processes for lens, film or the like.

For example, in a case of injection molding, employed are method according to which temperature of polymer melting is heightened or polymer temperature is kept relatively high within a mold. Acceding to another method for producing film, polymer is dissolved in a solvent and the obtained polymer solution is developed on substrate and then the solvent is eliminated by drying.

Indeed suppressing of polymer orientation is achievable to an extent as described above, but suppressing of orientation gives a generally reduced production velocity as compared that of production without suppressing orientation.

Further saying, an improvement in order to prevent photoelasticity birefringence from emerging has been applied. For example, in cases of injection molding or extruding molding where an optical member is produced from melting state, volume of polymer occurs shrinkage during a temperature reduction from melting state to normal temperature, with the result that distortion is generated by stress and photoelasticity birefringence is raised. Therefore, heating at a temperature lower than a certain temperature for several hours to several ten hours in order to remove distortion. Of course, such a process added reduces production efficiency and bring an economical disadvantage.

In addition, even if distortion is removed, any external force is applied during being used, photoelasticity birefringence emerges, which gives a shortage not overcome.

Although researches for reducing birefringence of optical resin by adding an additive have been carried out and some of them have been reported, every art aims to make only one of orientation birefringence and photoelasticity birefringence of an optical resin of base material of an optical member roughly zero by cancelling said one by orientation birefringence or photoelasticity birefringence of inverse sign of the additive.

According to orientation cancelling methods, a monomer of plus sign orientation birefringence and another monomer of minus sign orientation birefringence are copolymerized, or an organic compound of low molecular-weight (low molecular-weight organic compound) is added. Academic articles report that such methods are applicable for cancelling photoelasticity birefringence.

However, according to tow methods above, addition concentration of the low molecular-weight organic compound or copolymerization composition of copolymer which is required to deaden and almost eliminate orientation birefringence is largely different from a value required to deaden and almost eliminate photoelasticity birefringence, failing to almost eliminate both orientation birefringence and photoelasticity birefringence.

Concretely seeing, in the first place, Non-patent Document 1 noted below discloses "Method of cancelling birefringence by copolymerization". According to this method, birefringence of polymer chains is cancelled by performing copolymerization randomly at an appropriate ration between a monomer composing homopolymer showing plus orientation birefringence (i.e. monomer of plus orientation birefringence) and another monomer composing homopolymer showing minus orientation birefringence (i.e. monomer of minus orientation birefringence). Non-patent Document 1 shows benzyl methacrylate as a monomer of plus orientation birefringence and methyl methacrylate as a monomer of minus orientation birefringence and, which are copolymerized. Further, it is shown that orientation birefringence is almost eliminated at a weight-ration 82/18 for benzyl methacrylate/methyl methacrylate, and that photoelasticity birefringence is almost eliminated at a ration 92/8 for benzyl methacrylate/methyl methacrylate, Next, Patent Document 1 noted below discloses an invention relating to "Method of cancelling birefringence by adding a low molecular-weight organic compound". According to this invention, a low molecular-weight organic compound to a polymer resin having plus or minus orientation birefringence, wherein the low molecular-weight organic compound has orientation birefringence of sign inverse to sign of the polymer resin so that orientation birefringence of the low molecular-weight organic compound cancels that of the polymer and aiming to obtain a non-birefringent optical resin material.

In an embodiment thereof, trans-stilbene is added to polymethyl methacrylate to cancel birefringence of polymethyl methacrylate. Orientation birefringence of polymethyl methacrylate containing trans-stilbene added thereto is almost eliminated when addition concentration of trans-stilbene is 3.0 wt %.

Next, Non-patent Document 2 noted below discloses "Method of cancelling photoelasticity birefringence of polymer by adding a low molecular-weight organic compound", which is similar to the method disclosed in Patent Document 1 referred to above.

According to an example thereto which is similar to the embodiment disclosed in Patent Document 1, trans-stilbene is employed as an additive to be added to polymethyl methacrylate.

According to reported data in the example, photoelasticity birefringence of polymethyl methacrylate containing trans-stilbene added thereto is almost eliminated when addition concentration of trans-stilbene is 2.2 wt %, while orientation birefringence of polymethyl methacrylate containing trans-stilbene added there to is almost eliminated when addition concentration of trans-stilbene is 3.0 wt %, which tells that both values of addition concentration are largely different.

In connection with the present invention, it is noted that Non-patent Document 3 noted below gives description of infrared-dichroism method which is a well-known method and utilized for measuring degree of orientation of principal chains of copolymer molecules or homopolymers, as referred to later.

Non-patent Document 1; Shuichi Iwata, Hisashi Tsukahara, Eisuke Nihei, and Yasuhiro Koike, Applied Optics, vol. 36, p. 4549-4555 (1997)

Non-patent Document 1; Tokkai-Hei 8-110402 (JP)

Non-patent Document 2; H. Ohkita, K. Ishibashi, D. Tsurumoto, A. Tagaya, and Y. Koike, Applied Physics A, published online on Dec. 21, 2004.

Non-patent Document 3; Akihiro Tagaya, Shuichi Iwata, Eriko Kawanami, Hisashi Tsukahara, and Yasuhiro Koike, Jpn. J. Appl. Phys. vol. 40, p. 6117-6123 (2001)

DISCLOSURE OF INVENTION

Although it has been known to eliminate generally either orientation birefringence or photoelasticity birefringence by choosing additives to be added to a light permeable polymer and addition concentration thereof or by choosing composition of copolymerization and composition ratio thereof, no suitable art for eliminate generally both orientation birefringence and photoelasticity birefringence together has been proposed as described above.

Therefore, any one of both causes a drawback to emerge inevitably if known optical resin is appeared to various optical member (such as light transmitting sheets, lenses or prism sheets).

That is, if the optimum addition concentration or the optimum copolymerization composition ratio for deadening "orientation birefringence" is chosen in order to avoid orientation birefringence from emerging in a process such as drawing molding, extrusion molding or injection molding which is generally included in processes for producing these optical members, photoelasticity birefringence is deadened insufficiently, with the result that various external forces cause photoelasticity birefringence to emerge when the optical members are mounted.

Alternatively, if addition concentration or copolymerization composition ratio suitable for deadening photoelasticity birefringence is chosen, orientation birefringence brought by the above process is deadened insufficiently.

The present invention proposes an art which enables both orientation birefringence and photoelasticity birefringence of an optical resin material to be almost eliminated, overcoming disadvantages as above-described of prior arts, and object of the present invention are to provide an optical resin material both orientation birefringence and photoelasticity birefringence of which are generally eliminated together and to provide an optical member employing the optical resin material.

The present invention realizes the above objects by introducing an art according to which an optical material having a composite system of 3 or more constituents containing copolymerization system of monomer-element number not smaller than 2 is subject to a choice of combination of constituents and constituent ratio (composition ratio) of the composite constituent system, the choice being such that both orientation birefringence and photoelasticity birefringence of the optical material are cancelled together.

It is noted that a part of the composite constituent system may be an additive (low molecular-weight organic compound) that is included in no copolymerization system or instead the composite constituent system may consist of only a copolymerization system(s).

More specifically, a non-birefringent optical resin material in accordance with the present invention contains a composite constituent system of constituent number z not smaller than 3 under definition of constituent number such that monomer-element number x (x≧2) of a copolymer is included in constituent number z, wherein the composite constituent system consists of either only a copolymerization system(s) of monomer-element number x not smaller than 3 or both a copolymer of monomer-element number x not smaller than 2 and at least one kind of low molecular-weight organic compound which has an anisotropic polarizability and is capable of being orientated in a polymer.

Further, combination of constituents composing said composite constituent system are set so that "at least one of respective signs of characteristic orientation birefringence of respective homopolymers corresponding to respective monomers providing respective components of said copolymer and a common sign of orientation birefringence shown by said low molecular-weight organic compound in said respective homopolymers is different from the other signs of orientation birefringence, and further so that at least one of respective signs of photoelasticity birefringence of said respective homopolymers and a common sign of photoelasticity birefringence shown by said low molecular-weight organic compound in said respective homopolymers is different from the other signs of photoelasticity birefringence".

Still further, constituent ratio of constituents composing said composite constituent system are set so that "said non-birefringent optical resin material has orientation birefringence and photoelasticity birefringence both of which are mutually deadened due to different-sign relations about said orientation birefringence and said photoelasticity birefringence"

Typically, characteristic orientation birefringence of the optical resin material has an absolute value not greater than $6.7 \times 10^{-2}$ and preferably not greater than $6.7 \times 10^{-3}$, and particularly preferably not greater than $3.3 \times 10^{-3}$.

In addition, absolute values in typical cases are not greater than $5.0 \times 10^{-11}$ ($Pa^{-1}$) and preferably not greater than $5.0 \times 10^{-12}$ ($Pa^{-1}$), and more preferably not greater than $1.0 \times 10^{-12}$ ($Pa^{-1}$).

And the low molecular-weight organic compound is chosen so that molecular-weight thereof is not greater than 2000 or, preferably, not greater than 1500 while the compounds have anisotropic polarizability and is capable of being orientated in a polymer.

It is noted that "characteristic orientation birefringence" is an index indicating how easily orientation birefringence is raised for each optical resin material and can be defined for optical resin materials containing, as base material, homopolymers or copolymers, characteristic orientation birefringence $\Delta n_o$ being expressed by the following relation formula including orientation birefringence $\Delta n$ and degree of orientation f.

$$\Delta n = f \times \Delta n_o \quad (a)$$

or $$\Delta n_o = \Delta n / f \quad (b);$$

where degree of orientation f is an index expressing degree of orientation of principle chains, and f=1 expresses a state such that entire polymer is orientated in one direction. Intensity (with sign ±) of orientation birefringence under this state corresponds to characteristic orientation birefringence $\Delta n_o$.

However, it is impossible to obtain state of f=1, and actually characteristic orientation birefringence $\Delta n_o$ is calculated by substituting an appropriate value of birefringence $\Delta n$ measured under an appropriate value(s) of f (one or more) satisfying f<1 for $\Delta n$ in the above formula (a) or (b).

As described about cases shown later, an example of preferable value of f is f=0.03 and, if this value is used, the following formula is obtained.

$$\Delta n_o = \Delta n / 0.03 \quad (c)$$

The above condition, "absolute value of characteristic orientation birefringence of the optical resin material is not greater than $6.7 \times 10^{-2}$" can be expressed by other words "intensity of birefringence appearing under a condition of degree of orientation f=0.03 is about $2 \times 10^{-2}$ or less".

Next, the present invention provides an optical member, such as sheet-like member lens-like member, which is obtained by applying molding process to the optical resin. Molding may be extruding, drawing or injection molding.

Optical members in accordance with the present invention not only prevent these molding processes from bringing orientation birefringence but also hardly show photoelasticity birefringence even if they are subject to elastic deformation since they are formed of resin showing almost neither orientation birefringence nor photoelasticity birefringence.

The present invention enables bot orientation birefringence and photoelasticity birefringence of an optical resin material to be deadened together so that both are almost eliminated. Further, optical members almost free from orientation birefringence are obtained by employing such optical resin materials, which have deadened and almost eliminated orientation birefringence and deadened and almost eliminated photoelasticity birefringence, as materials for composing the optical members, even if they are produced through any process, such as extruding molding, drawing molding or injection molding, which causes polymer principal chains to be orientated.

In addition, optical resin in accordance with the present invention may be employed as a constituent of optical glue or adhesive, and if so employed, the optical glue or adhesive existing in an optical path (for example, in a case where a lens is stuck to another lens with the optical glue) can avoids the optical path or polarization state from being disturbed.

A graph conceptually shows a relation between composition ratio $C_{M1}$ of monomer 1 and orientation birefringence together with a relation between composition ratio $C_{M1}$ of monomer 1 and photoelasticity constant, for a copolymer consisting of monomer 1 and monomer 2.

FIG. 2

A graph conceptually shows a relation between addition concentration $C_{AM}$ of a low molecular-weight organic compound and orientation birefringence together with a relation between addition concentration $C_{AM}$ of a low molecular-weight organic compound and photoelasticity constant.

FIG. 3

Figure 4A:
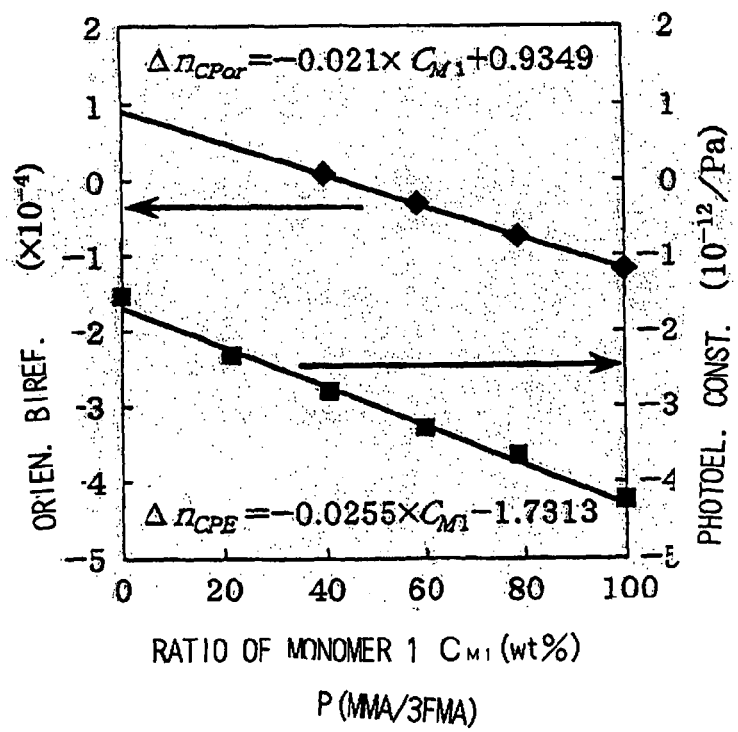
Figure 4B:
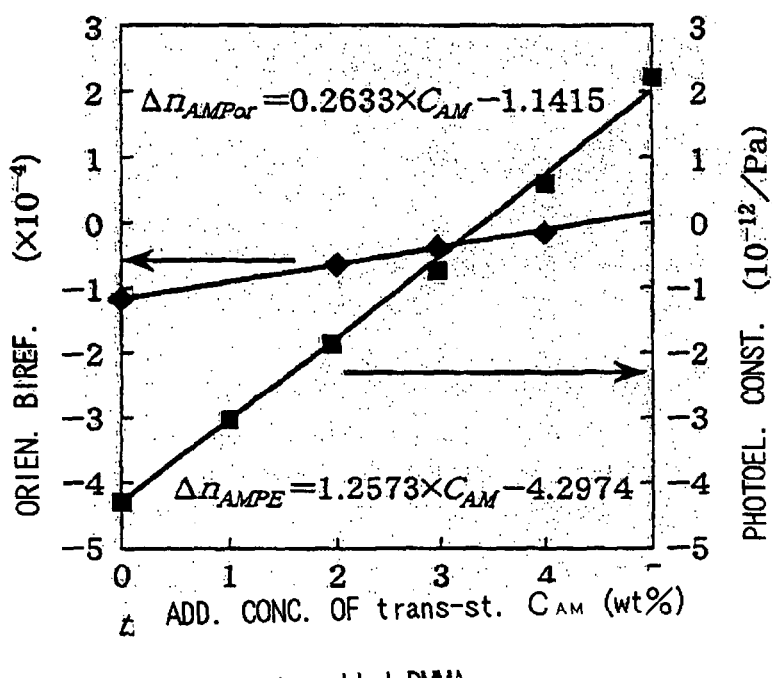

Graphs of FIGS. 4a, 4b conceptually show relations between composition ratio $C_{M1}$ of monomer 1 and orientation birefringence together with relations between composition ratio $C_{M1}$ of monomer 1 and photoelasticity constant, for copolymer 1 and copolymer 2, respectively.

FIG. 4

Figure 5A:
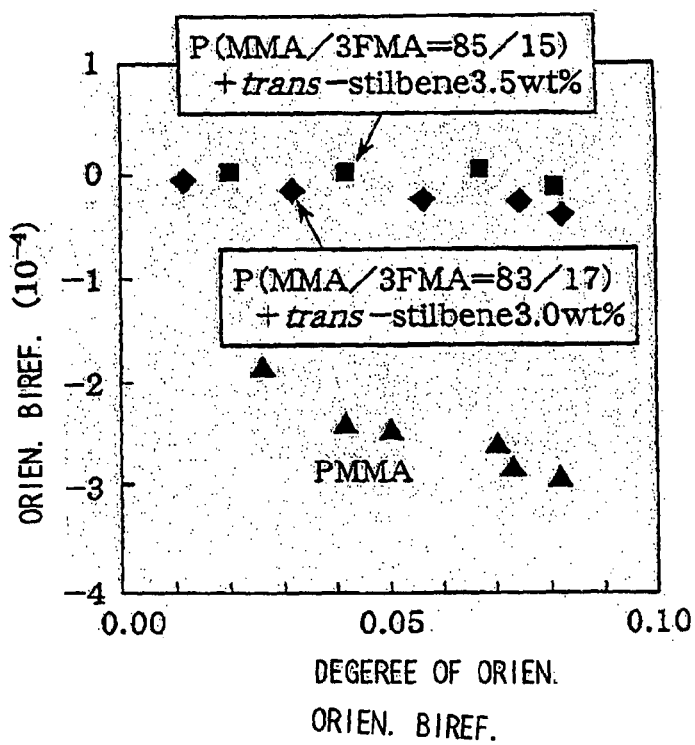

Graphs of FIGS. 4a, 4b for embodiment 1 show relations between composition ratio of a monomer and orientation birefringence together with relations between concentration of additive and orientation birefringence, and relations between composition ratio of the monomer and photoelasticity constant together with relations between concentration of additive and photoelasticity constant; Graph of FIG. 5a showing a relation between composition ratio $C_{M1}$ of PMMA and orientation birefringence together with a relation between composition ratio $C_{M1}$ of PMMA 1 and photoelasticity constant; Graph of FIG. 4b showing a relation between addition concentration of trans-stilbene and orientation birefringence together with a relation between addition concentration of trans-stilbene and photoelasticity constant.

FIG. 5

Figure 5B:
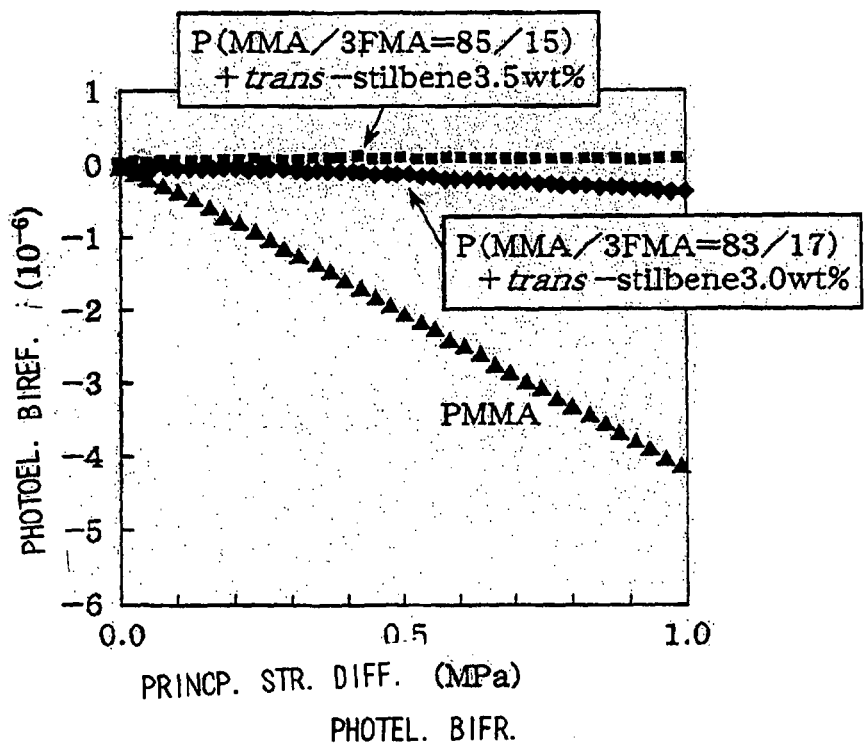

Graphs of FIGS. 5a, 5b show measurement results of orientation birefringence and photoelasticity constant, respectively, for two kinds of samples prepared in Embodiment 1 and References (PMMA as simple substance).

FIG. 6

Figure 6A:
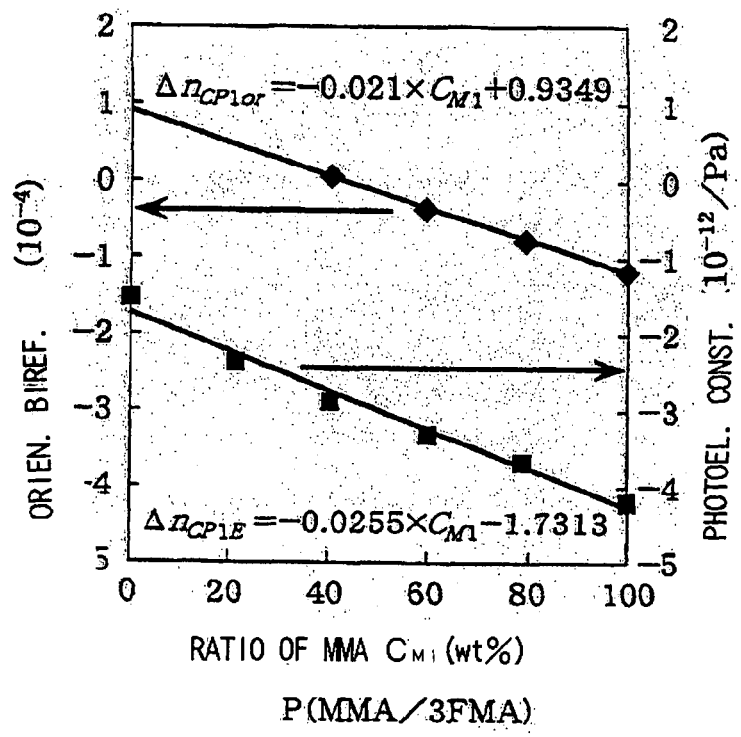
Figure 6B:
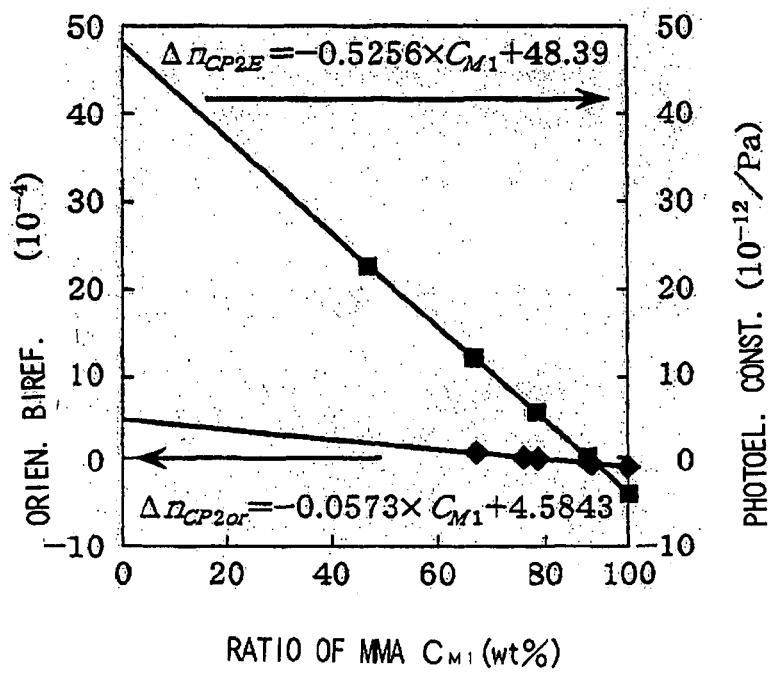

Graph of FIG. 6a for Embodiment 2 shows measurement results of a relation between composition ratio of copolymer 1=P(MMA/3FMA)) and orientation birefringence together with a relation between composition ratio of copolymer 1=P(MMA/3FMA)) and photoelasticity constant; and Graph of FIG. 6b for Embodiment 2 shows measurement results of a relation between composition ratio of copolymer 2=P(MMA/BzMA) and orientation birefringence together with a relation between composition ratio of copolymer 2=P(MMA/BzMA) and photoelasticity constant.

FIG. 7

Figure 7A:
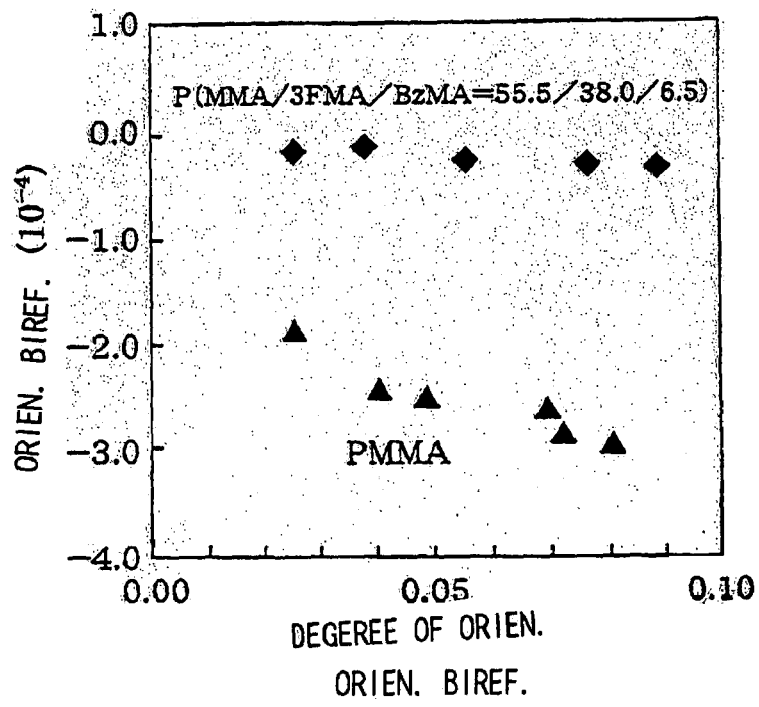
Figure 7B:
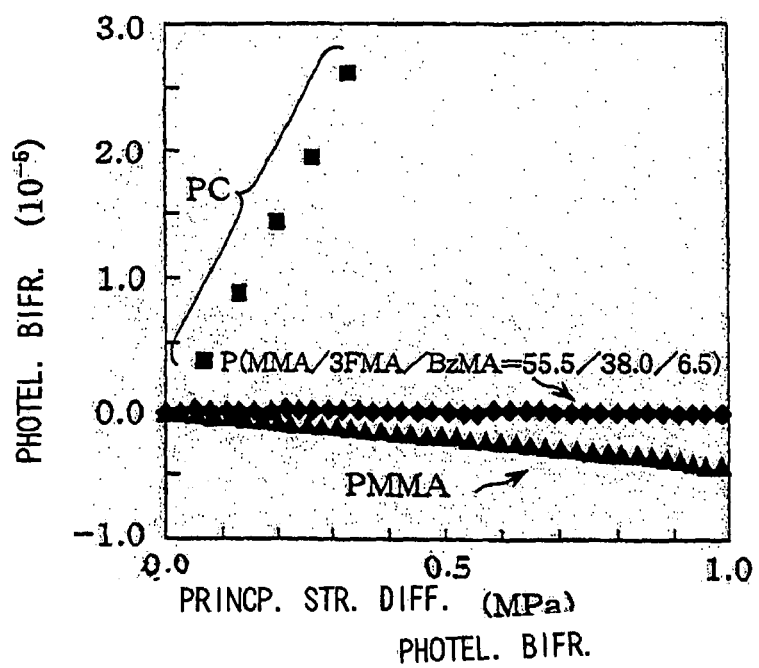

Graphs of FIGS. 7a, 7b show measurement results of orientation birefringence and photoelasticity constant, respectively, for a sample prepared in Embodiment 2 and References (PMMA as simple substance).

FIG. 8

A cross section view for illustrating an example of liquid crystal display element comprising a liquid crystal layer, a polarizing plate and a resin sheet which is formed of a non-birefringent optical resin material obtained by the present invention.

FIG. 9

A cross section view for illustrating another example of liquid crystal display element comprising a liquid crystal layer, a polarizing plate and a resin sheet which is formed of a non-birefringent optical resin material obtained by the present invention.

FIG. 10

A method of measuring photoelasticity constant is illustrated.

BEST MODES FOR EMBODYING INVENTION

As described already, the present invention deadens both orientation birefringence and photoelasticity birefringence together by utilizing a composite constituent system of constituent-element number not smaller than 3, typically by employing either method (i) or (ii) utilizing three-constituent-system.

(i) Both orientation birefringence and photoelasticity birefringence are deadened together and being eliminated by adding a low molecular-weight organic compound to a copolymer of two-monomer-constituent system.

(ii Both orientation birefringence and photoelasticity birefringence are deadened together and being eliminated by adjusting constituent-ration of a copolymer of three-monomer-element copolymerization-system (copolymerization-ratio).

Figure 1:
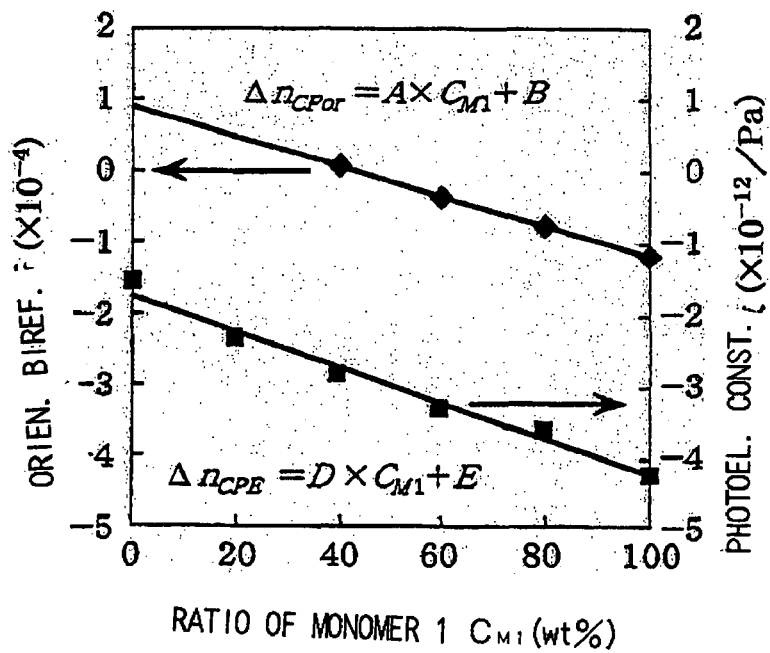
FIG. 1
Figure 2:
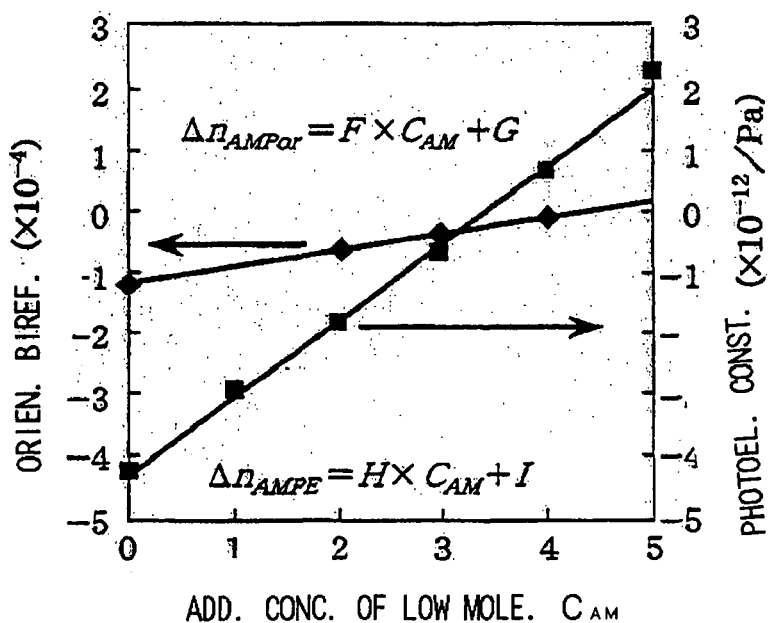

In the first place, described are steps according the above typical examples (i), (ii) in accordance with the present invention for cancelling both orientation birefringence and photoelasticity birefringence together, with FIGS. 1 to 3 being referenced one by one.

<Method for Deadening and Eliminating Both Orientation Birefringence and Photoelasticity Birefringence Together by Adding a Low Molecular-Weight Organic Compound to Two-Monomer-Constituent System>

[1]; A copolymerization system is formed of two-monomer-constituent system consisting of monomer 1 and monomer 2. Monomer 1 and monomer 2 (concrete examples are described later) are prepared and copolymerization reactions are carried out under various constituent-ratios (copolymerization-ratios), respectively, and a plurality of copolymer films are produced as to have various copolymerization-ratios. One-axis-drawing is applied to each of the films.

Conditions of the one-axis-drawing are adjusting so that degree of orientation of principal chains of the copolymer films give an appropriate value. It is noted that degree of orientation of principal chains cane be measured by a well-known infrared dichroism method (See Non-patent Document 3 foresaid; the same hereafter), and degree of orientation is measured after for each film after being on-axis-drawn wherein films having values of degree of orientation are removed.

First, orientation birefringence is measured for the remained films (one-axis-drawing finished).

[2]; Orientation birefringence $\Delta n_{CPor}$ is approximately given by the following linear expression (1) on constituent ratio $C_{M1}(\%)$ of monomer 1, based on measurement results shown by ♦-plotting in the graph of FIG. 1.

$$\Delta n_{CPor} = A \times C_{M1} + B \tag{1};$$

where A, B are constants which can be determined based on ♦-plotting positions in FIG. 1, for example, by applying method of least squares.

[3]; Next prepared are a plurality of solid-cylindrical blocks formed of copolymers of monomer 1 and monomer 2, composition ratios between monomer 1 and monomer 2 being different from each other, and photoelasticity birefringence is measured for each of the blocks under being applied various external stresses and a constant temperature sufficiently lower than the glass transition temperature by utilizing a well-known method for measuring photoelasticity birefringence. Photoelasticity birefringence constants for the respective copolymer compositions are determined from results of the measurement. Although methods for measuring photoelasticity birefringence are well-known, one example is explained by referring FIG. 10.

Figure 10:
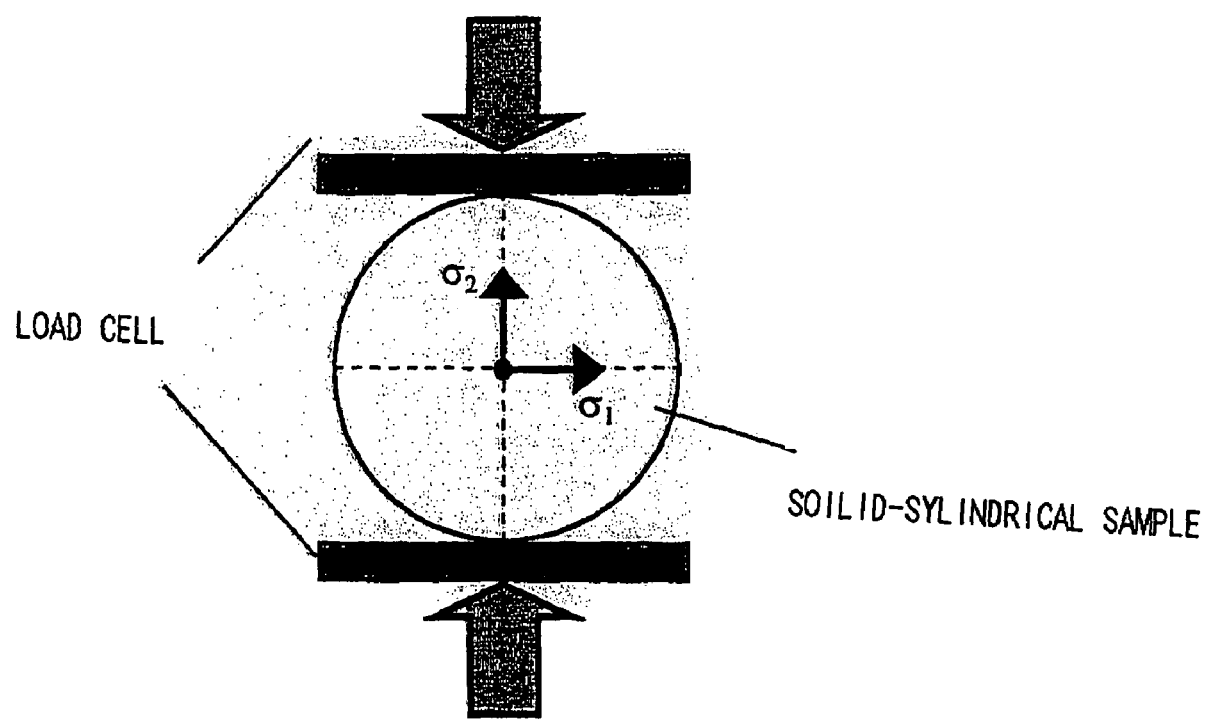

As shown in FIG. 10, external load force applied a solid-cylindrical elastic block raises compression stress in a direction along a direction of the applied load force at a center axis of the block. In addition, however, not only this, but also tension stress is generated in a direction perpendicular to the easily loading force direction at the center axis. This phenomenon is understood from a fact that an elastic body (for example, robber) is expanded, in general, in a direction perpendicular to a direction of contracting caused by load force.

For a case where load force is applied to a solid-cylindrical sample sideways as shown in FIG. 10, there is a known relation between intensity of the load force and stress effected to points on the center axis.

Therefore, if the load force is controlled precisely by using a load cell or the like, difference of stress acting on that occasion on the center axis can be determined. In a cross section perpendicular to a center axis of a solid-cylinder, stress is acted in two directions as described already. These stressed are generally called "principal stress", and principal stress $\sigma_1$ and principal stress $\sigma_2$ are shown in the figure. Principal stress difference is defined as $\sigma_1-\sigma_2$. Now photoelasticity constant is denoted by symbol $\gamma$ for the sake of convenience, photoelasticity constant $\gamma$ satisfies a relation the following formula (★) with respect to principal stress difference $\sigma_1-\sigma_2$.

$$\Delta n_E=\gamma(\sigma_1-\sigma2) \quad (★)$$

In general, photoelasticity birefringence $\Delta n_E$ is measured under some number of values of principal stress difference and photoelasticity constant $\gamma$ is calculated based on the above formula (★) by applying method of least squares or the like.

[4]; Photoelasticity birefringence $\Delta n_{CPE}$ to be calculated is given by the following linear expression (2) on constituent ratio $C_{M1}$(%) of monomer 1, as shown by ■-plotting in the graph of FIG. 1.

$$\Delta n_{CPE}=D\times C_{M1}+E \quad (2);$$

where D, E are constants which can be determined based on ■-plotting positions in FIG. 1, for example, by applying method of least squares.

[5]; A plurality of films are produced by adding low molecular-weight organic compound of various values of addition concentration to homopolymer consisting of monomer 1. one-axis-drawing is applied to the films and orientation birefringence thereby generated is measured.

It is noted that conditions of the one-axis-drawing are adjusting so that degree of orientation of principal chains of the homopolymer in the films give an appropriate value, in the manners like those previously referred to. Degree of orientation of principal chains cane be measured by a well-known infrared dichroism method, and degree of orientation is measured after for each film after being on-axis-drawn wherein films having values of degree of orientation are removed.

It is preferable to employ a low molecular-weight organic compound that has a molecular-weight not greater than 2000, in particular not greater than 1500, anisotropic polarizability and capability of orientating in a polymer.

[6]; Orientation birefringence $\Delta n_{AMPor}$ is approximately given by the following linear expression (3) on addition concentration $C_{AM}$(%) of low molecular-weight organic compound, base of on measurement results.

$$\Delta n_{AMPor}=F\times C_{AM}+G \quad (3);$$

where F, G are constants which can be determined based on ◆-plotting positions in FIG. 1, for example, by applying method of least squares.

In addition, constant G corresponds to orientation birefringence of the homopolymer to which no low molecular-weight organic compound is added. Contribution the added low molecular-weight organic compound to orientation birefringence is expressed by $F\times C_{AM}$.

[7]; Prepared are a plurality of solid-cylindrical blocks formed of homopolymer composed of monomer 1 containing various values of addition concentration, and photoelasticity birefringence is measured for each of the blocks under being applied various external stresses and a constant temperature sufficiently lower than the glass transition temperature by utilizing a well-known method for measuring photoelasticity birefringence. Photoelasticity birefringence constants under the respective values of addition concentration are determined from results of the measurement.

[8]; Photoelasticity birefringence $\Delta n_{AMPE}$ to be calculated is given by the following linear expression (4) on addition concentration $C_{AM}$(%) for each film as shown by ■-plotting in the graph of FIG. 2.

$$\Delta n_{AMPE}=H\times C_{AM}+I \quad (4);$$

where H, I are constants which can be determined based on ■-plotting positions in FIG. 2, for example, by applying method of least squares. In addition, I corresponds to photoelasticity birefringence of the homopolymer to which no low molecular-weight organic compound is added. Contribution the added low molecular-weight organic compound to photoelasticity birefringence is expressed by $H\times C_{AM}$.

[9]; Entire orientation birefringence $\Delta n_{or}$ and photoelasticity constant $\Delta n_E$ are given by the following formulae based on the above formulae (1)-(4).

$$\Delta n_{or}=A\times C_{M1}+B+F\times C_{AM} \quad (5)$$

$$\Delta n_E=D\times C_{M1}+E+H\times C_{AM} \quad (6);$$

where $$C_{M1}>0, C_{AM}>0 \quad (7),$$

because $C_{M1}$ and $C_{AM}$ to be employed are positive values.

If there exist any set of $C_{M1}$ and $C_{AM}$ satisfying that both left sides of the above condition formulae (5) and (6) are equal to zero ($\Delta n_{or}=\Delta n_E=0$) and satisfy the above condition formulae (5) and (6), it is possible to synthesize an optical resin in which almost neither orientation birefringence nor photoelasticity birefringence is generated under the values of composition and addition concentration roughly corresponds to the above set.

Values of $C_{M1}$ and $C_{AM}$ giving $\Delta n_{or}=\Delta n_E=0$ cane be determined by solving equations, with A, B, D, E, F, G and H in the above formulae (5), (6) being substituted by values of these constants determined through the processes described above, and if both $C_{M1}$ and $C_{AM}$ are employable if they are positive. This is expressed by the following formulae (8a), (8b).

$$C_{M1}=(-B\times H+E\times F)/(A\times H-D\times F)>0 \quad (8a)$$

$$C_{AM}=(-A\times E+B\times D)/(A\times H-D\times F)>0 \quad (8b)$$

Actually, there exist A, B, D, E, F, G and H satisfying the above (8a) and (8b). A concrete example is shown later in description of Embodiments.

<Method for Deadening and Eliminating Both Orientation Birefringence and Photoelasticity Birefringence Together by Adjusting Copolymerization Composition Ratio of Three-Monomer-Constituent System>

[1]; Prepared are monomer 1, monomer 2 (both are general names and may be different monomers as compared with monomer 1 and 2 previously referred to) and monomer 3, and it is supposed to form a copolymer copolymer 1) composed of monomer 1 and monomer 2, and to form another copolymer (copolymer 2) composed of monomer 1 and monomer 3.

A plurality of copolymer films formed of copolymer 1 are produced as to have having various copolymerization-ratios. In addition, a plurality of copolymer films formed of copolymer 2 are produced as to have having various copolymerization-ratios.

One-axis-drawing is applied to each of the produced films, and orientation birefringence generated is measured.

Conditions of the one-axis-drawing are adjusting so that degree of orientation of principal chains of the copolymers in the films give an appropriate value, in the manners like those previously referred to. Degree of orientation of principal chains cane be measured by a well-known infrared dichroism method, and degree of orientation is measured after for each film after being on-axis-drawn wherein films having values of degree of orientation are removed.

Figure 3A:
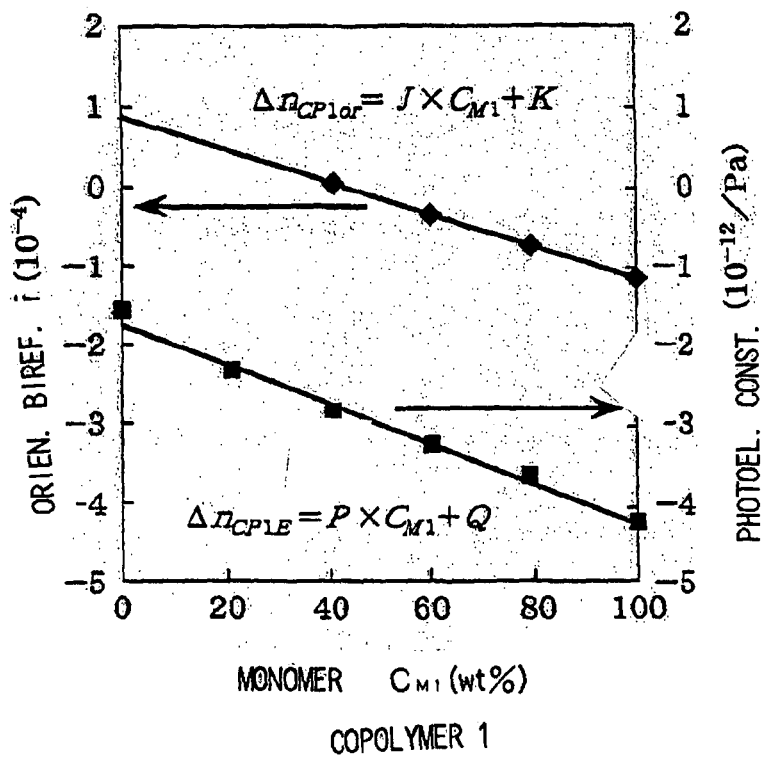

[2]; A relation between orientation birefringence $\Delta n_{CP1or}$ of copolymer 1 and constituent ratio C (%) of monomer 1 is approximately given by the following linear expression (9) based on measurement results shown in FIG. 3a.

$$\Delta n_{CP1or} = J \times C_{M1} + K \quad (9);$$

where J, K are constants which can be determined based on ♦-plotting positions in FIG. 3a, for example, by applying method of least squares.

Figure 3B:
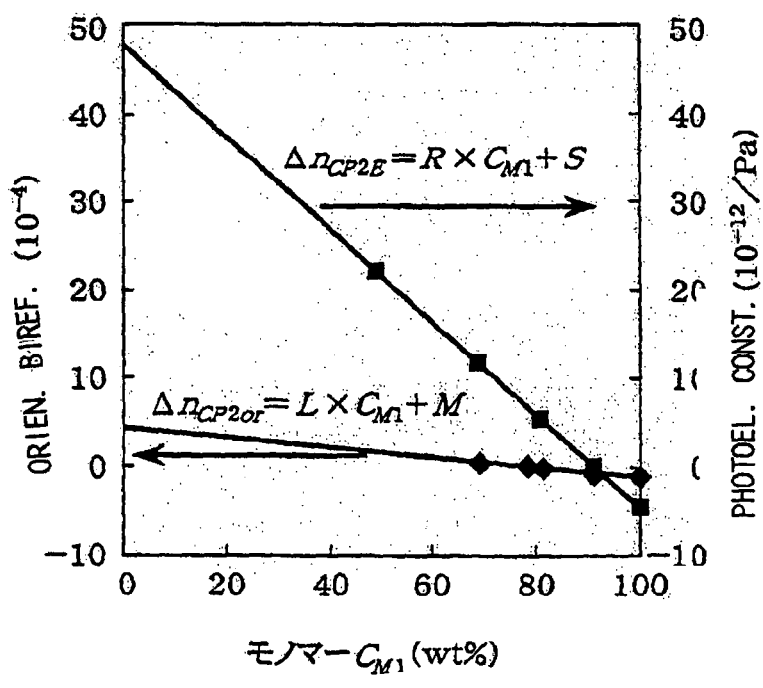

In a similar way, a relation between orientation birefringence $\Delta n_{CP2or}$ of copolymer 2 and constituent ratio $C_{M1}(\%)$ of monomer 1 is approximately given by the following linear expression (10) based on measurement results shown in FIG. 3b.

$$\Delta n_{CP2or} = L \times C_{M1} + M \quad (10);$$

where L, M are constants which can be determined based on ♦-plotting positions in FIG. 3b, for example, by applying method of least squares.

[3]; Next prepared are a plurality of solid-cylindrical blocks formed of copolymers of monomer 1 and monomer 2, composition ratios between monomer 1 and monomer 2 being different from each other.

In addition, prepared are a plurality of solid-cylindrical blocks formed of copolymers of monomer 1 and monomer 3, composition ratios between monomer 1 and monomer 2 being different from each other.

Photoelasticity birefringence is measured for each of the blocks under being applied various external stresses and a constant temperature sufficiently lower than the glass transition temperature by utilizing a well-known method for measuring photoelasticity birefringence. Photoelasticity birefringence constants for the respective copolymer compositions are determined from results of the measurement.

[4]; Based on results of the above measurement, a relation between photoelasticity constant $\Delta n_{CP1E}$ of copolymer 1 and composition ratio $C_{M1}$ (wt %) of monomer 1 are approximately given by the following linear expression (11), as shown in FIG. 3a.

$$\Delta n_{CP1E} = P \times C_{M1} + Q \quad (11);$$

where P, Q are constants which can be determined based on ■-plotting positions in FIG. 3a, for example, by applying method of least squares.

In a similar way, a relation between photoelasticity constant $\Delta n_{CP2E}$ of copolymer 2 and composition ratio $C_{M1}$ (wt %) of monomer 1 are approximately given by the following linear expression (12), as shown in FIG. 3b.

$$\Delta n_{CP2E} = R \times C_{M1} + S \quad (12);$$

where R, S are constants which can be determined based on ■-plotting positions in FIG. 3b, for example, by applying method of least squares.

[5]; Putting $C_{M1} = 100$ wt % in the above formulae (9) and (11), contribution of polymer 1 formed of only monomer 1 to orientation birefringence and to photoelasticity constant is calculated, being expressed by the following formulae (13) and (14).

$$\Delta n_{P1or} = 100J + K \quad (13)$$

$$\Delta n_{P1E} = 100P + Q \quad (14)$$

[6]; On the other hand, putting $C_{M1} = 0$ wt % in the above formulae (9) and (11), contribution of polymer 2 formed of only monomer 2 to orientation birefringence and to photoelasticity constant is calculated, being expressed by the following formulae (15) and (16).

$$\Delta n_{P2or} = K \quad (15)$$

$$\Delta n_{P2E} = Q \quad (16)$$

[7]; In a similar way, putting $C_{M1} = 0$ wt % in the above formulae (10) and (12), contribution of polymer 3 formed of only monomer 3 to orientation birefringence and to photoelasticity constant is calculated, being expressed by the following formulae (17) and (18).

$$\Delta n_{P3or} = M \quad (17)$$

$$\Delta n_{P3E} = S \quad (18)$$

[8]; Now, composition ratios of monomer 1, monomer 2 and monomer 3 in a three-monomer-element copolymer are denoted by $\alpha$(wt %), $\beta$(wt %), $\gamma$(wt %), respectively. Following formula (19) is satisfied by $\alpha$, $\beta$ and $\gamma$.

$$\alpha + \beta + \gamma = 100 \quad (19)$$

[9]; Thus orientation birefringence $\Delta n_{or}$ and photoelasticity constant $\Delta n_E$ of the three-monomer-element copolymer are given by the following formulae (20) and (21).

$$\begin{aligned}\Delta n_{or} &= \Delta n_{P1or} \times \alpha + \Delta n_{P2or} \times \beta + \Delta n_{P3or} \times \gamma \\ &= (100J + K)\alpha + K \times \beta + M \times \gamma\end{aligned} \quad (20)$$

$$\begin{aligned}\Delta n_E &= \Delta n_{P1E} \times \alpha + \Delta n_{P2E} \times \beta + \Delta n_{P3E} \times \gamma \\ &= (100P + Q)\alpha + Q \times \beta + S \times \gamma\end{aligned} \quad (21)$$

[10]; J, K, M, P, Q and S have been determined from measurement results previously referred to.

Therefore, there are cases in which $\alpha$, $\beta$ and $\gamma$ (all being positive values) satisfying $\Delta n_{or} = \Delta n_E = 0$ can be determined by solving simultaneous equations of formulae (19), (20) and (21).

In other words, if any set of $\alpha$, $\beta$ and $\gamma$ satisfying these at the same time and $\alpha > 0$, $\beta > 0$ and $\gamma > 0$, it is possible to synthesize an optical resin in which almost neither orientation birefringence nor photoelasticity birefringence is generated under in the vicinity of the values of composition corresponds to the above set. A concrete example is shown in description of Embodiments.

The above description is summary of processes according to the foresaid typical examples (i) and (ii) cancelling both orientation birefringence and photoelasticity birefringence together by utilizing arts the present invention has introduced, and idea of this art can be applied, if expanded, to cases of "combination consisting of copolymer of monomer-element number not smaller than 3 and low molecular-weight organic compound", "combination consisting of copolymer of monomer-element number not smaller than 4 and low molecular-weight organic compound" or "copolymer of monomer-element number not smaller than 4".

consisting of "low molecular-weight organic compound" may be called low-molecule" hereafter for saving words.

Studying mathematically general cases of "system of copolymer of monomer-element number n+m kind(s) of additive(s)" under a condition of $n \geq 3$ and $m \geq 1$, it is understood that unknown variables are not determined uniquely in attempt to determine general formulae for determining composition ratio, because number of equations is too small with respect to number of the unknown variables.

Obtainable are only three formulae regarding orientation birefringence and photoelasticity birefringence $\Delta n_{or}$ and photoelasticity birefringence $\Delta n_E$ of entire (copolymer+low-molecule), and regarding composition ratio of copolymers composing the copolymer, as shown later by formulae (127) to (129).

Accordingly, three of more unknown variables regarding copolymer of monomer-element number not smaller than 3, and further a unknown variable(s) regarding addition concentration of low-molecule is brought, with the result that number of equations are short. Similar situation also arises if two or more kinds of low-molecules are added.

It should be noted, however, that shortage of number of equations does not mean that the equations has no solution (i.e. composition ratio making both orientation birefringence and photoelasticity birefringence about 0 together), as understood from the fore-described typical examples, and this rather mathematically corresponds to situation that "solutions" are too much.

It is possible to determine approximately a composition ratio (please pay attention to that it may be not unique solution) capable of eliminating both orientation birefringence and photoelasticity birefringence together by numerical calculation for general case of system consisting of monomer-element number n+m kind(s) of low-molecule additives (n≧3 and m≧1, or n≧4 and m≧0). Numerical calculation consists of four basic arithmetical operations, being performable with personal computers or the like as known well.

Now given is a simple description about general cases of "system consisting of monomer-element number n+m kind(s) of low-molecule additive(s). It is noted that formula numbers of 100 something or 200 something are used hereafter for the sake of description.

<Cases of (Monomer 1. Monomer 2, . . . Monomer n)+ (Low-Molecule 1, Low-Molecule 2 . . . Low-Molecule m)>

Based on previous discussion on measurement results for copolymers consisting of monomers 1 and 2 or monomers 1 and 3, the following approximating formulae are satisfied.

Regarding copolymer 1; (monomer 1/monomer 2)

$$\Delta n_{CP1or} = A_{CP1} \times C_{M1} + B_{CP1} \tag{101}$$

$$\Delta n_{CP1E} = D_{CP1} \times C_{M1} + E_{CP1} \tag{102}$$

From these formulae, the following formulae are obtained.

$$\Delta n_{P1or} = 100 A_{CP1} + B_{CP1} \tag{103}$$

$$\Delta n_{P1E} = 100 D_{CP1} + E_{CP1} \tag{104}$$

In addition, contribution $\Delta n_{P2or}$ of monomer 2 to orientation birefringence and contribution $\Delta n_{P2E}$ of monomer 2 to photoelasticity birefringence are obtained as follows under $C_{M1}=0$.

$$\Delta n_{P2or} = B_{CP1} \tag{105}$$

$$\Delta n_{P2E} = E_{CP1} \tag{106}$$

Regarding copolymer 2; (monomer 1/monomer 3), obtained formulae are as follows.

$$\Delta n_{CP2or} = A_{CP2} \times C_{M1} + B_{CP2} \tag{107}$$

$$\Delta n_{CP2E} = D_{CP2} \times C_{M1} + E_{CP2} \tag{108}$$

Based on these formulae, contribution $\Delta n_{P3or}$ of monomer 3 to orientation birefringence and contribution $\Delta n_{P3E}$ of monomer 3 to photoelasticity birefringence are obtained as follows under $C_{M1}=0$.

$$\Delta n_{P3or} = B_{CP2} \tag{109}$$

$$\Delta n_{P3E} = E_{CP2} \tag{110}$$

Generalizing the above, the following formula are obtained.

Regarding copolymer n−1; (monomer 1/monomer n), obtained formulae are as follows.

$$\Delta n_{CPn1or} = A_{CPn-1} \times C_{M1} + B_{CPn-1} \tag{111}$$

$$\Delta n_{CPn-1E} = D_{CPn-1} \times C_{M1} + E_{CPn-1} \tag{112}$$

Based on these formulae, contribution $\Delta n_{Pnor}$ of monomer n to orientation birefringence and contribution $\Delta n_{PnE}$ of monomer n to photoelasticity birefringence are obtained as follows under $C_{M1}=0$.

$$\Delta n_{Pnor} = B_{CPn-1} \tag{113}$$

$$\Delta n_{PnE} = E_{CPn-1} \tag{114}$$

Next, discussed are about birefringence brought in cases where low-molecules 1 to m are added at concentrations of $C_{AM1} \sim C_{AMm}$, respectively, to homopolymer consisting of only monomer 1. It is noted that addition concentration is expressed by weight concentration under a condition that quantity of polymer (entire polymer quantity) is 100.

First, based on previous discussion on measurement results for low-molecule 1, the following approximating formulae are satisfied.

Regarding low-molecule 1, the following formulae are satisfied.

$$\Delta n_{AMP1or} = F_{AMP1} \times C_{AM1} + G_{AMP1} \tag{115}$$

$$\Delta n_{AMP1E} = H_{AMP1} \times C_{AM1} + I_{AMP1} \tag{116}$$

Based on these, contribution of low-molecule 1 to orientation birefringence is as follows.

$$F_{AMP1} \times C_{AM1} \tag{117}$$

Contribution of low-molecule 1 to photoelasticity birefringence is as follows.

$$H_{AMP1} \times C_{AM1} \tag{118}$$

The following formulae are obtained for low-molecule 2 . . . low-molecule m.

Regarding low-molecule 2, the following formulas are satisfied.

$$\Delta n_{AMP2or} = F_{AMP2} \times C_{AM2} + G_{AMP2} \tag{119}$$

$$\Delta n_{AMP2E} = H_{AMP2} \times C_{AM2} + I_{AMP2} \tag{120}$$

Based on these, contribution of low-molecule 2 to orientation birefringence is as follows.

$$F_{AMP2} \times C_{AM2} \tag{121}$$

Contribution of low-molecule 2 to photoelasticity birefringence is as follows.

$$H_{AMP2} \times C_{AM2} \tag{122}$$

Regarding low-molecule m, the following formulas are satisfied.

$$n_{AMPmor} = F_{AMPm} \times C_{AMm} + G_{AMPm} \tag{123}$$

$$\Delta n_{AMPmE} = H_{AMPm} \times C_{AMm} + I_{AMPm} \tag{124}$$

Based on these, contribution of low-molecule m to orientation birefringence is as follows.

$$F_{AMPm} \times C_{AMm} \tag{125}$$

Contribution of low-molecule m to photoelasticity birefringence is as follows.

$$H_{AMPm} \times C_{AMm} \tag{126}$$

Thus, approximating condition formula for deadening total orientation birefringence $\Delta n_{or}$, approximating condition formula for deadening total photoelasticity birefringence $\Delta n_E$, and related formulae are as follows for <(monomer 1. monomer 2, . . . monomer n)+(low-molecule 1, low-molecule 2 . . . low-molecule m)>.

$$\Delta n_{or} = (\alpha_1 \times \Delta n_{P1or} + \alpha_2 \times \Delta n_{P2or} + \ldots + \alpha_n \times \Delta n_{Pnor}) + (\Delta n_{AMP1or} + \Delta n_{AMP2or} + \ldots + \Delta n_{AMPor})$$

$$= (\alpha_1 \times (100 A_{CP1} + B_{CP1}) + \alpha_2 \times B_{CP1} + \ldots + B_{CPn-1}) + (F_{AMP1} \times C_{AM1} + F_{AMP2} \times C_{AM2} + \ldots + F_{AMPm} \times C_{AMm}) = 0 \quad (127)$$

$$\Delta n_E = (\alpha_1 \times \Delta n_{P1E} + \alpha_2 \times \Delta n_{P2E} + \ldots + \alpha_n \times \Delta n_{PnE}) + (\Delta n_{AMP1E} + \Delta n_{AMP2E} + \ldots + \Delta n_{AMPmE}) =$$

$$= (\alpha_1 \times (100 D_{CP1} + E_{CP1}) + \alpha_2 \times E_{CP1} + \ldots + E_{CPn-1}) + (H_{AMP1} \times C_{AM1} + H_{AMP2} \times C_{AM2} + + H_{AMPm} \times C_{AMm}) = 0 \quad (128)$$

$$\alpha_1 + \alpha_2 + \ldots + \alpha_m = 100 \quad (129);$$

where $\alpha_1, \alpha_2 \ldots \alpha_m$ express constituents ratios (i.e. composition ratios) of monomer 1 to monomer m in copolymer in percentage (%).

It is noted that m=1, 2, and n=2, 3 . . . .

It is understood from the above discussion that copolymerization ratio and addition concentration of low-molecule satisfying the above formulae (127) to (129) are required to be determined. Now discussed is how to determine them.

First, in the above formulae (127) and (128), $A_{CP1}$, $B_{CP1} \sim B_{CPn-1}$, $D_{CP1}$, $E_{CP1} \sim E_{CPn-1}$, $F_{AMP1} \sim F_{AMPm}$ and $H_{AMP1} \sim H_{AMPm}$ can be determined by measurements as understood from the examples previously described.

In addition, as described already, for a case of n=2 and m=1, namely, a case of <two-monomer-element copolymerization+low-molecule 1>, $\alpha_1$, $\alpha_2$ and $C_{AM1}$ can be described by solving analytically formulae (127) to (129) to determine constituent ratio and addition concentration, because three equations are provided with respect to three unknown variables.

It is noted that consideration as described below is taken on choosing combination of constituents because solutions including any negative unknown variable value are unemployable.

At least one of respective signs of characteristic orientation birefringence of respective homopolymers corresponding to respective monomers providing respective components of a copolymer and a common sign of orientation birefringence shown by a low-molecule in the respective homopolymers is different from the other signs of orientation birefringence.

At least one of respective signs of photoelasticity birefringence of the respective homopolymers and a common sign of photoelasticity birefringence shown by the low-molecules in the respective homopolymers is different from the other signs of photoelasticity birefringence.

If n+m is not smaller than 4, it is impossible to solve the above equations analytically. As described already, this does not means that "there exist no solution" but means in a sense "boeing not able to be specified".

Further, practical "monomer-element number" of a copolymerization is 5 or less, and monomer-element numbers greater than 10 are rather unpractical.

On the other hand, number of kind(s) of added low-molecule(s) is 1 in almost every case, and three kinds or more are not employed in almost every case.

Within such a practical range, it is possible to find values satisfying the simultaneous equations (127) to (129) at an accuracy level practically involving no problem by utilizing a personal computer or the like and by applying a so-called numerical solution method. Attention should be paid to that all sets of solutions are not required to be determined.

In addition, since number of unknown variables are greater than number of independent equations, employable is a method according to which some of the unknown variables are (is) set provisionally at approximate value(s) and the rest unknown variables are determined sequentially.

Now described on a simple example of concrete calculation.

Regarding <3-monomer-element copolymerization+low-molecule 1>;

[1] Now $\alpha_1$ is exemplarily set at a positive value.

[2] This reduces number of unknown variables by one, with the result that $\alpha_2$, $\alpha_3$ and $C_{AM1}$ can be described by solving equations (127) to (129) in a manners similar to those employed in a case of <2-monomer-element copolymerization+low-molecule 1>.

If there is a set every value of unknown variables is positive, the set gives composition ratio to be determined (one of composition ratios). If such solution is not obtained, the above value of $\alpha_1$ is replaced by another positive value and values of $\alpha_2$, $\alpha_3$ and $C_{AM1}$ are calculated newly.

Alternatively, values of $\alpha_1$ at appropriate numerical intervals are prepared initially. Regarding example, if values of $\alpha_1$=0.1, 0.2, 0.3 . . . 99.9 are prepared, and $\alpha_2$, $\alpha_3$ and $C_{AM1}$ are calculated for each value of $\alpha_1$, it is known whether solution exists or not, and, if any solution exists, values of the solution(s) are proved approximately. If higher accuracy is aimed, it will give a good result to perform further detailed calculation around a value seeming to be a solution.

Regarding <4-monomer-element copolymerization+low-molecule 1>;

[1] Now $\alpha_1$ and $\alpha_2$ are exemplarily set at positive values, respectively.

[2] This reduces number of unknown variables by two, with the result that $\alpha_3$, $\alpha_4$ and $C_{AM1}$ can be described by solving equations (127) to (129) in a manners similar to those employed the foresaid case.

If there is a set every value of unknown variables is positive, the set gives composition ratio to be determined (one of composition ratios). If such solution is not obtained, the above value set of $\alpha_1$ and $\alpha_2$ are replaced by another positive value set and values of $\alpha_3$, $\alpha_4$ and $C_{AM1}$ are calculated newly.

Alternatively, value sets of ($\alpha_1$, $\alpha_2$) at appropriate numerical intervals are prepared initially.

For example, if value sets of ($\alpha_1$=0.1, $\alpha_2$=0.1). ($\alpha_1$=0.1, $\alpha_2$=0.2). ($\alpha_1$=0.2, $\alpha_2$=0.1), ($\alpha_1$=0.2, $\alpha_2$=0.2) . . . ($\alpha_1$=99.9, $\alpha_2$=99.92) are prepared, and $\alpha_3$, $\alpha_4$ and $C_{AM1}$ are calculated for each set of values of ($\alpha_1$, $\alpha_2$), it is known whether solution exists or not, and, if any solution exists, values of the solution(s) are proved approximately. If higher accuracy is aimed, it will give a good result to perform further detailed calculation around a value seeming to be a solution.

Similarly hereafter, in cases of <5-monomer-element copolymerization+low-molecule 1>, <5-monomer-element copolymerization+low-molecule 1>+low-molecule 2> or the like, values of $\alpha_1$, $\alpha_2$ . . . , $C_{AM1}$, $C_{AM2}$ . . . may be determined provisionally one by one individually or as set's so that number of unknown variables is reduced to three, in order to determine the rest unknown variables by solving equations (127) to (129). Such calculations are not so hard if a personal computer is used.

Regarding in cases where copolymers of monomer-element number 4 or more without adding low-molecule, situation is generally the same.

That is, similarly to the cases described above, if it is attempted to get general solutions for systems monomer-element number n not smaller than 4, number of equations is too small with respect to number of unknown variables, with the result that values of the unknown variables can not determined, too.

However, numerical is applicable to get a solution as described about cases of copolymer of monomer-element number not smaller than 3 and low-molecule. Mathematical essence is not changed as compared with cases involving addition of low-molecule, and now described simply wherein some explanations are repeated.

<Cases of Monomer 1. Monomer 2, . . . Monomer n>

It is understood that the foresaid formulae (101) to (110) are satisfied, based of previous discussion, with measurement results being referenced, about copolymer formed of monomers 1, 2 or monomer 1, 3.

Regarding copolymer 1; (monomer 1/monomer 2), the following formulas are satisfied.

$$\Delta n_{CP1or} = A_{CP1} \times C_{M1} + B_{CP1} \tag{101}$$

$$\Delta n_{CP1E} = D_{CP1} \times C_{M1} + E_{CP1} \tag{102}$$

Based on these, contribution $\Delta n_{P1or}$ of monomer 1 to orientation birefringence and contribution $\Delta n_{P1E}$ of monomer 1 to photoelasticity birefringence are as follows, under $C_{M1}=100$.

$$\Delta n_{P1or} = 100 A_{CP1} + B_{CP1} \tag{103}$$

$$\Delta n_{P1E} = 100 D_{CP1} + E_{CP1} \tag{104}$$

Further, contribution $\Delta n_{P21or}$ of monomer 2 to orientation birefringence and contribution $\Delta n_{P2E}$ of monomer 2 to photoelasticity birefringence are as follows under $C_M 1 = 0$.

$$\Delta n_{P2or} = B_{CP1} \tag{105}$$

$$\Delta n_{P2E} = E_{CP1} \tag{106}$$

Regarding copolymer 2; (monomer 1/monomer 3), the following formulas are satisfied.

$$\Delta n_{CP2or} = A_{CP2} \times C_{M1} + B_{CP2} \tag{107}$$

$$\Delta n_{CP2E} = D_{CP2} \times C_{M1} + E_{CP2} \tag{108}$$

Based on these, contribution $\Delta n_{P3or}$ of monomer 3 to orientation birefringence and contribution $\Delta n_{P3E}$ of monomer 3 to photoelasticity birefringence are as follows under $C_{M1}=0$.

$$\Delta n_{P3or} = B_{CP2} \tag{109}$$

$$\Delta n_{P3E} = E_{CP2} \tag{110}$$

Generalizing the above, the following formula are obtained, as described previously.

Regarding copolymer n−1; (monomer 1/monomer n), obtained formulae are as follows.

$$\Delta n_{CPn-1or} = A_{CPn-1} \times C_{M1} + B_{CPn-1} \tag{111}$$

$$\Delta n_{CPn-1E} = D_{CPn-1} \times C_{M1} + E_{CPn-1} \tag{112}$$

Based on these, contribution $\Delta n_{Pnor}$ of monomer n to orientation birefringence and contribution $\Delta n_{PnE}$ of monomer n to photoelasticity birefringence are as follows, under $C_{M1}=0$.

$$\Delta n_{Pnor} = B_{CPn-1} \tag{113}$$

$$\Delta n_{PnE} = E_{CPn-1} \tag{114}$$

Thus, approximating condition formula for deadening total orientation birefringence $\Delta n_{or}$, approximating condition formula for deadening total photoelasticity birefringence $\Delta n_E$, and related formulae are as follows for (monomer 1. monomer 2, . . . monomer n).

$$\begin{aligned}\Delta n_{or} &= \alpha_1 \times \Delta n_{P1or} + \alpha_2 \times \Delta n_{P2or} + \ldots + \alpha_n \times \Delta n_{Pnor} \\ &= \alpha_1 \times (100 A_{CP1} + B_{CP1}) + \alpha_2 \times B_{CP1} + \ldots + B_{CPn-1}) \\ &= 0\end{aligned} \tag{227}$$

$$\begin{aligned}\Delta n_E &= \alpha_1 \times \Delta n_{P1E} + \alpha_2 \times \Delta n_{P2E} + \ldots + \alpha_n \times \Delta n_{Pn}E \\ &= \alpha_1 \times (100 D_{CP1} + E_{CP1}) + \alpha_2 \times E_{CP1} + \ldots + E_{CPn-1} \\ &= 0\end{aligned} \tag{228}$$

$$\alpha_1 + \alpha_2 + \ldots + \alpha_m = 100; \tag{229}$$

where $\alpha_1, \alpha_2 \ldots \alpha_m$ express constituents ratios (i.e. composition ratios) of monomer 1 to monomer m in copolymer in percentage (%).

It is noted that formula numbers of (227) to (29) are employed for making correspondence relation with formula numbers of (127) to 129) easily understood.

It is understood from the above discussion that copolymerization ratio satisfying the above formulae (227) to (229) are required to be determined. Method of determination thereof is generally the same as that employed in a case of low-molecule-addition.

First, in the above formulae (227) and (228), $A_{CP1}$, $B_{CP1}$~$B_{CPn-1}$, $D_{CP1}$ and $E_{CP1}$~$E_{CPn-1}$ can be determined by measurements as understood from the examples previously described.

In addition, as described already, for a case of n=3, namely, a case of <three-monomer-element copolymerization>, $\alpha_1$, $\alpha_2$ and $\alpha_3$ can be described by solving analytically formulae (227) to (229) to determine constituent ratio, because three equations are provided with respect to three unknown variables.

It is noted that consideration as described below is taken on choosing combination of constituents because solutions including any negative unknown variable value are unemployable.

At least one of respective signs of characteristic orientation birefringence of respective homopolymers corresponding to respective monomers providing respective components of a copolymer is different from the other signs of orientation birefringence.

At least one of respective signs of photoelasticity constants of the respective homopolymers is different from the other signs of photoelasticity constant(s).

As described previously, if n is not smaller than 4, it is impossible to solve the above equations analytically, but this does not means that "there exist no solution.

Further, practical number of kinds (i.e. monomer-element number) of a copolymerization is 5 or less, and numbers greater than 10 are rather unpractical.

Therefore, within such a practical range, it is possible to find values satisfying the simultaneous equations (227) to (229) at an accuracy level practically involving no problem by utilizing a personal computer or the like and by applying a so-called numerical solution method. Attention should be paid to that all sets of solutions are not required to be determined.

In addition, since number of unknown variables are greater than number of independent equations, employable is a method according to which some of the unknown variables are (is) set provisionally at approximate value(s) and the rest unknown variables are determined sequentially.

Now described on a simple example of concrete calculation.

Regarding <4-monomer-element copolymerization>;

[1] Now $\alpha_1$ is exemplarily set at a positive value.

[2] This reduces number of unknown variables, with the result that $\alpha_2$, $\alpha_3$ and $\alpha_4$ can be described by solving equations (227) to (229) in manners similar to those employed in a case of <3-monomer-element copolymerization>.

If there is a set every value of unknown variables is positive, the set gives composition ratio to be determined (one of composition ratios). If such solution is not obtained, the above value of $\alpha_1$ is replaced by another positive value and values of $\alpha_2$, $\alpha_3$ and $\alpha_4$ are calculated newly.

Alternatively, values of $\alpha_1$ at appropriate numerical intervals are prepared initially. For example, if values of $\alpha_1$=0.1, 0.2, 0.3 . . . 99.9 are prepared, and $\alpha_2$, $\alpha_3$ and $\alpha_4$ are calculated for each value of a it is known whether solution exists or not, and, if any solution exists, values of the solution(s) are proved approximately. If higher accuracy is aimed, it will give a good result to perform further detailed calculation around a value seeming to be a solution.

Regarding <5-monomer-element copolymerization>;

[1] Now $\alpha_1$ and $\alpha_2$ are exemplarily set at positive values, respectively.

[2] This reduces number of unknown variables by two, with the result that $\alpha_3$, $\alpha_4$ and $\alpha_5$ can be described by solving equations (227) to (229) in a manners similar to those employed the foresaid case.

If there is a set every value of unknown variables is positive, the set gives composition ratio to be determined (one of composition ratios). If such solution is not obtained, the above value set of $\alpha_1$ and $\alpha_2$ are replaced by another positive value set and values of $\alpha_3$, $\alpha_4$ and $\alpha_5$ are calculated newly.

Alternatively, value sets of ($\alpha_1$, $\alpha_2$) at appropriate numerical intervals are prepared initially.

For example, if value sets of ($\alpha_1$=0.1, $\alpha_2$=0.1). ($\alpha_1$=0.1, $\alpha_2$=0.2). ($\alpha_1$=0.2, $\alpha_2$=0.1), ($\alpha_1$=0.2, $\alpha_2$=0.2) . . . ($\alpha_1$=99.9, $\alpha_2$=99.92) are prepared, and $\alpha_3$, $\alpha_4$ and $\alpha_5$ are calculated for each set of values of ($\alpha_1$, $\alpha_2$), it is known whether solution exists or not, and, if any solution exists, values of the solution(s) are proved approximately. If higher accuracy is aimed, it will give a good result to perform further detailed calculation around a value seeming to be a solution.

Similarly hereafter, in cases of <6-monomer-element copolymerization>, <7-monomer-element copolymerization or the like, values of $\alpha_1$, $\alpha_2$ . . . may be determined provisionally one by one individually or as sets so that number of unknown variables is reduced to three, in order to determine the rest three unknown variables by solving equations (227) to (229). Such calculations are not so hard if a personal computer is used.

EMBODIMENTS

Two Embodiments (Embodiment 1 and Embodiment 2) are described べお w.

Embodiment 1 gives an example of the foresaid method (i) according to which both orientation birefringence and photoelasticity birefringence are deadened and eliminated by adding low molecular-weight organic compound to copolymer of monomer-element number 2.

On the other hand, Embodiment 2 gives an example of the foresaid method (ii) according to which both orientation birefringence and photoelasticity birefringence are deadened and eliminated by setting composition ratio of copolymer of monomer-element number 3.

It is noted that formula number stars from 0022 which follows 0021 previously used for the sake of convenience.

Embodiment 1

In the first place, 2-monomer-element copolymer was synthesized and estimation thereof were carried out as follows.

Initially, sample tubes made of glass were prepared, and methyl methacrylate (MMA; Mitsubishi Gas Chemical Co., Inc.) and 2,2,2-trifluoroethyl methacrylate (3FMA; Jemco Inc.), totally weighing 30 g, into the sample tube, and further added thereto are perbutyl-O (Nippon Oil and Fats Co., Ltd) of 0.5 wt % with respect to the monomers and n-butyl mercaptan (Wakoh Junyaku Kogyo Inc.) of 0.3 wt % with respect to the monomers.

Monomer ratios (weight-ratios) were adjusted at MMA/3FMA=100/0, 80/20, 60/40, 40/60, 20/80 and 0/100, respectively.

These were stirred and dissolved as to be uniform sufficiently, then being filtered through Membrane Filter formed of PTFE and having a hole diameter of 0.2 μm (Toyo Roshi Inc.), and each of samples of respective monomer ratios were transferred into a pair test tubes. These test tubes were put in a water bath of 70° C. to perform polymerization for 24 hours.

Next, heating was applied in a dryer at 90° C. for 24 hours.

Polishing was applied to both end faces of one of solid-cylindrical polymers belonging to each obtained pair. Load force was applied to a side of each of these solid-cylindrical polymers (18 mm in diameter; 10 mm in length) and photoelasticity birefringence was measure by laser light incidence along a solid-cylinder-axial direction with automatic birefringence measurement apparatus ABR-10A (Uniopto Inc.). Further to this, photoelasticity constants were determined for the respective copolymers of respective monomer ratios based on the obtained measurement results.

The other polymer of each pair was put into a sample tube formed of glass together with tetrahydrofuran (Wakoh Junyaku Kogyo Inc.) of four times thereof in weight ratio, being stirred and dissolved well.

The obtained polymer solutions were developed on glass plates with a knife coating tool, being left under room temperature for one day to be dried. Films were stripped from the glass plates, being dried further in a reduced-pressure dryer at 60° C. for 48 hours.

The obtained films of about 40 μm in thickness were deformed as to have a into dumb-bell-like shape, and one-axis-drawing was applied to them by a Tensiron universal test apparatus (Orientec Inc.).

Temperature during drawing, drawing velocity and others were adjusted so the degree of principal chains of copolymers was 0.03. Table 1 shows drawing conditions employed.

TABLE 1

| Drawing Condition of P(MMA/3FMA | | | |
|---|---|---|---|
| | MAGNIFICATION OF DRAWING | TEMPERATURE ° C. | VELOCITY OF DRAWING (mm/min) |
| P(MMA | 2 | 130 | 2 |
| P(MMA/3FMA = 8/20) | 2 | 130 | 7 |
| P(MMA/3FMA = 60/40) | 2 | 130 | 14 |
| P(MMA/3FMA = 40/60) | 2 | 120 | 3.5 |
| P(MMA/3FMA = 20/80) | Drawing failed due to film brittleness | | |
| P3FMA | Drawing failed due to film brittleness | | |

It is noted that some samples failed to have degree of orientation of in processes of adjusting drawing conditions, being removed. Confirmation of realizing of degree of orientation equal to 0.03 was performed by measuring degree of orientation according to infrared dichroism absorption method after for the films after being drawn.

As described previously, it is well-known to measure degree of orientation of principal chains of copolymer molecules or homopolymer by utilizing infrared dichroism absorption method, and details are disclosed in Non-patent Document 3 previously referred to.

Birefringence was measured for each of the drawn films degree of orientation of which proved to be 0.03 by utilizing automatic birefringence measurement apparatus ABR-10A (Uniopto Inc.).

Next, low molecular-weight organic compounds were added to PMMA, being tested.

First, MMA of 30 g is put into sample tubes together with perbutyl-O of 0.5 wt % with respect to MMA, n-butyl mercaptan of 0.3 wt % with respect to the monomer, and trans-stilbene as a low molecular-weight organic compound.

Trans-stilbene was adjusted to realize 1 wt %, 2 wt %, 3 wt % 4 wt % and wt % with respect to MMA.

These were stirred and dissolved as to be uniform sufficiently, then being filtered through Membrane Filter formed of PTFE and having a hole diameter of 0.2 μm (Toyo Roshi Inc.), and each of samples of respective monomer ratios were transferred into a pair test tubes. These test tubes were put in a water bath of 70° C. to perform polymerization for 24 hours. Next, heating was applied in a dryer at 90° C. for 24 hours.

The above-described processes of producing sampled for measurement and measurements for P(MMA/3FMA) as above are applied to the trans-stilbene-added PMMA. Drawing conditions employed are shown in Table 2.

TABLE 2

Drawing Condition of trans-stilbene-added PMMA

| ADDITION VELOCITY OF DRAWING (mm/min) | QUANTITY (wt %) OF trans-stilbene | MAGNIFI-CATION | TEMPERATURE OF DRAWING |
|---|---|---|---|
| 2 | 2 | 130 | 27 |
| 3 | 2 | 120 | 14 |
| 4 | 2 | 120 | 27 |

Experiment results obtained from the above are shown in FIGS. 4a and 4b.

First, referring to FIG. 4a, ♦-plotting expresses actually measured points for a relation between orientation birefringence $\Delta n_{CPor}$ and concentration $C_{M1}$ of MMA (corresponding to monomer 1 previously described).

On the other hand, ■-plotting expresses actually measured points for a relation between photoelasticity birefringence $\Delta n_{CPE}$ and concentration $C_{M1}$ of MMA (corresponding to monomer 1 previously described).

Both points of ♦-plotting and points of ■-plotting are arranged generally on straight lines, respectively, and approximating linear expressions expressing these lines as described previously are given by the following formulae (22) and (23).

$$\Delta n_{CPor} = -0.021 \times C_{M1} + 0.9349 \tag{22}$$

$$\Delta n_{CPE} = -0.0255 \times C_{M1} - 1.7313 \tag{23}$$

Referring to FIG. 4b, ♦-plotting expresses actually measured points for a relation between orientation birefringence $\Delta n_{CPor}$ and addition concentration $C_{AM}$ of low molecular-weight organic compound (trans-stilbene).

On the other hand, ■-plotting expresses actually measured points for a relation between photoelasticity birefringence $\Delta n_{AMPE}$ and addition concentration $C_{AM}$ of low molecular-weight organic compound (trans-stilbene).

Both points of ♦-plotting and points of ■-plotting are arranged generally on straight lines, respectively, and approximating linear expressions expressing these lines as described previously are given by the following formulae (24) and (25).

$$\Delta n_{AMPor} = 0.2633 \times C_{M1} - 1.1415 \tag{24}$$

$$\Delta n_{AMPE} = 1.2573 \times C_{M1} - 4.2974 \tag{25}$$

Formulae (22) to (25) means that values of the foresaid constants A, B, D, E, F and H are determined.

Thus, putting numerical values into foresaid formulae (5) and (6), obtained are the following formulae (26) and (27) expressing total orientation birefringence $\Delta n_{or}$ and photoelasticity constant $\Delta n_E$ in a case where trans-stilbene is added to 2-monomer-element copolymer P(MMA/3FMA).

$$\Delta n_{or} = -0.021 \times C_{M1} + 0.9349 + 0.2633 \times C_{AM} \tag{26}$$

$$\Delta n_E = -0.0255 \times C_{M1} - 1.7313 + 1.2573 \times C_{AM} \tag{27}$$

Putting the left sides of both of these formulae $\Delta n_{or} = \Delta n_E = 0$, and solving simultaneous equations regarding unknown variables $C_{M1}$, $C_{AM}$, the following results were obtained.

Ration of MMA; $C_{M1}$=83.1 wt %

Ration of 3FMA; 100−$C_{M1}$=16.9 wt %

Addition concentration of trans-stilbene: $C_{AM}$=3.06 wt % (ration under MMA=100)

These are theoretical values based on the foresaid approximating linear expression model and can be slightly different from actual optimum values. Considering this, polymers of the following compositions were synthesized as polymers having values around the above theoretical values.

Polymer containing MMA/3FMA=83/17 and trans-stilbene of 3.0 wt % as additive

Polymer containing MMA/3FMA=85/15 and trans-stilbene of 3.5 wt % 添 as additive

In addition, pure PMMA was prepared as Reference Example to demonstrate difference in birefringence as compared with no-addition polymer.

Orientation birefringence and photoelasticity birefringence were measured for these two kinds of samples and Reference Example.

Before measuring orientation birefringence, one-axis drawing was applied under various drawing conditions by utilizing the foresaid apparatus to prepare items of various degrees of orientation. Results are shown in FIG. 5a.

In FIG. 5a, points of ♦-plotting give values of orientation birefringence of a polymer (MMA/3FMA=83/17 and trans-stilbene of 3.0 wt % added thereto), and points of ■-plotting give values of orientation birefringence of another polymer (MMA/3FMA=85/15 and trans-stilbene of 3.5 wt % added thereto).

Further, points of ▲-plotting give values of orientation birefringence of the pure PMMA. Abscissa of graph expresses degree of orientation and ordinate expresses orientation birefringence.

On the other hand, when photoelasticity birefringence was measured, various principal stress differences were given by utilizing the foresaid apparatus. Results are shown in FIG. 5b.

In FIG. 5b, points of ♦-plotting give values of photoelasticity birefringence of a polymer (MMA/3FMA=83/17 and trans-stilbene of 3.0 wt % added thereto), and points of ■-plotting give values of photoelasticity birefringence of another polymer (MMA/3FMA=85/15 and trans-stilbene of 3.5 wt % added thereto).

Further, points of ▲-plotting give values of photoelasticity birefringence of the pure PMMA.

Abscissa of graph expresses applied principal stress difference and ordinate expresses photoelasticity birefringence.

Values of photoelasticity birefringence of the three were determined based on the results shown in FIGS. 5a and 5b, being shown in Table 3.

TABLE 3

Photoelasticity birefringence of P(MMA/3FMA) + trans-stilbene

| OPTICAL RESIN | PHOTO-ELASTICITY CONSTANT ($Pa^{-1}$) |
|---|---|
| P(MMA/3FMA = 83/17) + trans-stilbene 3.0 wt % | $-0.357 \times 10^{-12}$ |
| P(MMA/3FMA = 85/15) + trans-stilbene 3.0 wt % | $0.046 \times 10^{-12}$ |
| PMMA | $-4.225 \times 10^{-12}$ |

These results shown by FIGS. 5a, 5b and Table 3 proved that this Embodiment is capable of providing polymer both orientation birefringence and photoelasticity birefringence of which are so small that they can be regarded as almost 0 in usual usages.

In particular, when composition ratio was adjusted from a theoretical value so that P(MMA/3FMA=85/15)+trans-stilbene 3.5 wt % is brought, both birefringence values come to 0 almost completely. Thus it was proved that much smaller absolute values of photoelasticity constants were obtained as compared with a small photoelasticity constant absolute value given by PMMA.

Embodiment 2

In the first place, sample tubes made of glass were prepared, and methyl methacrylate (MMA) and 2,2,2-trifluoroethyl methacrylate (3FMA; Jemco Inc.), totally weighing 30 g, into the sample tube, and further added thereto are perbutyl-O of 0.5 wt % with respect to the monomers and n-butyl mercaptan of 0.3 wt % with respect to the monomers.

Monomer ratios (weight-ratios) were adjusted at MMA/3FMA=100/0, 80/20, 60/40, 40/60, 20/80 and 0/100, respectively.

These were stirred and dissolved as to be uniform sufficiently, then being filtered through Membrane Filter formed of PTFE and having a hole diameter of 0.2 μm (Toyo Roshi Inc.), and each of samples of respective monomer ratios were transferred into a pair test tubes. These test tubes were put in a water bath of 70° C. to perform polymerization for 24 hours. Next, heating was applied in a dryer at 90° C. for 24 hours.

Polishing was applied to both end faces of one of solid-cylindrical polymers (sample set for photoelasticity birefringence measurement). Load force was applied to a side of each of these solid-cylindrical polymers (18 mm in diameter; 10 mm in length) and photoelasticity birefringence was measure by laser light incidence along a solid-cylinder-axial direction with automatic birefringence measurement apparatus ABR-10A (Uniopto Inc.). Further to this, photoelasticity constants were determined for the respective copolymers of respective monomer ratios based on the obtained measurement results.

The other polymer of each pair (sample set for orientation birefringence measurement) was put into a sample tube formed of glass together with tetrahydrofuran (Wakoh Junyaku Kogyo Inc.) of four times thereof in weight ratio, being stirred and dissolved well.

The obtained polymer solutions were developed on glass plates with a knife coating tool, being left under room temperature for one day to be dried. Films were stripped from the glass plates, being dried further in a reduced-pressure dryer at 60° C. for 48 hours.

The obtained films of about 40 μm in thickness were deformed as to have a into dumb-bell-like shape, and one-axis-drawing was applied to them by a Tensiron universal test apparatus (Orientec Inc.).

Temperature during drawing, drawing velocity and others were adjusted so the degree of principal chains of copolymers was 0.03. These conditions are generally the same as those shown in Table 1 in Embodiment 1.

Birefringence was measured for each of the drawn films degree of orientation of which proved to be 0.03 by utilizing automatic birefringence measurement apparatus ABR-10A (Uniopto Inc.).

Degree of orientation was measured for each drawn film by applying infrared dichroism absorption method, and films proved to be provided with degree of orientation generally equal to 0.03 were remained.

The above series of sample preparing and measurements were also applied to copolymers of MMA and benzil methacrylate (BzMA). Drawing conditions thereof are shown in Table 4.

TABLE 4

Drawing Condition of P(MMA/BzMA)

| | MAGNIFICATION OF DRAWING | TEMPERATURE ° C. | VELOCITY OF DRAWING (mm/min) |
|---|---|---|---|
| P(MMA | 2 | 130 | 2 |
| P(MMA/BzMA = 92/8 | 2 | 140 | 8 |
| P(MMA/BzMA = 82/18 | 2 | 130 | 4 |
| P(MMA/BzMA = 80/20 | 2 | 130 | 10 |
| P(MMA/BzMA = 70/30 | 2 | 120 | 27 |

Experiment results obtained from the above are shown in FIGS. 6a and 6b.

First, referring to FIG. 6a, ♦-plotting expresses actually measured points for a relation between orientation birefringence $\Delta n_{CP1or}$ and concentration $C_{M1}$ of MMA (corresponding to monomer 1 previously described) for copolymer formed of MMA and 3FMA (corresponding to foresaid copolymer 1).

On the other hand, ■-plotting expresses actually measured points for a relation between photoelasticity birefringence $\Delta n_{CP1E}$ and concentration $C_{M1}$ of MMA (corresponding to monomer 1 previously described) for the same copolymer formed of MMA and 3FMA.

Both points of ♦-plotting and points of ■-plotting are arranged generally on straight lines, respectively, and approximating linear expressions expressing these lines as described previously are given by the following formulae (28) and (29).

$$\Delta n_{CP1or} = -0.021 \times C_{M1} + 0.9349 \quad (28)$$

$$\Delta n_{CP1E} = -0.0255 \times C_{M1} - 1.7313 \quad (29)$$

It is noted that these formulae (128), (129) are equivalent to foresaid formulae (122), (123), although there is difference in expression of left sides of them.

Referring to FIG. 6b, ♦-plotting expresses actually measured points for a relation between orientation birefringence $\Delta n_{CP2or}$ and composition ratio $C_{M1}$ of MMA (corresponding to foresaid monomer 1) for copolymer formed of MMA and BzMA (corresponding to foresaid copolymer 2).

On the other hand, ■-plotting expresses actually measured points for a relation between photoelasticity birefringence $\Delta n_{CP2E}$ and concentration $C_{M1}$ of MMA (corresponding to foresaid monomer 1) for the same copolymer formed of MMA and BzMA.

Both points of ◆-plotting and points of ■-plotting are arranged generally on straight lines, respectively, and approximating linear expressions expressing these lines as described previously are given by the following formulae (30) and (31).

$$\Delta n_{CP2or} = -0.0573 \times C_{M1} + 4.5843 \quad (30)$$

$$\Delta n_{CP2E} = -0.5256 \times C_{M1} + 48.39 \quad (31)$$

Formulae (28) to (31) means that values of the foresaid coefficients J, K, L, M, P, Q, R and S are determined.

Thus, putting numerical values into foresaid formulae (13) and (14), obtained are the following formulae (32) and (33) expressing total orientation birefringence $\Delta n_{P1or}$ photoelasticity constant $\Delta n_{P1E}$ for P(MMA/3FMA copolymer (copolymer 1).

$$\Delta n_{P1or} = 100J + K = -2.1 + 0.9349 = -1.1651 \quad (32)$$

$$\Delta n_{P1E} = 100P + Q = -2.55 - 1.7313 = -4.2813 \quad (33)$$

Further, putting numerical values into foresaid formulae (15) and (16), obtained are the following formulae (34) and (35) expressing total orientation birefringence $\Delta n_{P2or}$ and photoelasticity constant $\Delta n_{P2E}$ of P(MMA/BzMA) copolymer (copolymer 2).

$$\Delta n_{P2or} = K = 0.9349 \quad (34)$$

$$\Delta n_{P2E} = Q = -1.7313 \quad (35)$$

Still further, putting numerical values into foresaid formulae (17) and (18), obtained are the following formulae (36) and (37) expressing total orientation birefringence $\Delta n_{P3or}$ and photoelasticity constant $\Delta n_{P3E}$ of P(MMA/3FMA/BzMA) which is 3-monomer-element copolymer.

$$\Delta n_{P3or} = M = 4.5843 \quad (36)$$

$$\Delta n_{P3E} = S = 48.39 \quad (37)$$

Then, putting these into foresaid formulae (20) and (21) and solving simultaneous equations consisting of formulae (20), (21) and (19) regarding α, β and γ, the following results were obtained.

Composition ratio of MMA; α=55.5 wt %
Composition ratio of 3FMA; β=38.0 wt %
Composition ratio of BzMA; γ=6.5 wt %

Actually, 3-monomer-element copolymer, P(MMA/3FMA/BzMA), of the above composition ratio and was synthesized, and orientation birefringence and photoelasticity birefringence thereof were measured. In addition, pure PMMA was prepared as Reference Example to demonstrate difference in birefringence as compared with no-addition polymer. Measurement of orientation birefringence and photoelasticity birefringence were performed for these samples and Reference Example.

Before measuring orientation birefringence, one-axis drawing was applied under various drawing conditions by utilizing the foresaid apparatus to prepare items of a plurality of degrees of orientation.

Results are shown in FIG. 7a.

In FIG. 7a, points of ◆-plotting give values of orientation birefringence of 3-monomer-element copolymer (P(MMA/3FMA/BzMA)=55.5/38.0/6.5) and points of ▲-plotting give values of orientation birefringence of the pure PMMA. Abscissa of graph expresses degree of orientation and ordinate expresses orientation birefringence.

On the other hand, when photoelasticity birefringence was measured, various principal stress differences were given by utilizing the foresaid apparatus. Results are shown in FIG. 7b.

In FIG. 6b, points of ◆-plotting give values of photoelasticity birefringence of 3-monomer-element copolymer (P(MMA/3FMA/BzMA)=55.5/38.016.5) and points of ▲-plotting give values of photoelasticity birefringence of the pure PMMA. Abscissa of graph expresses applied principal stress difference and ordinate expresses photoelasticity birefringence.

Values of photoelasticity birefringence of both were determined based on the results shown in FIG. 7b, being shown in Table 5.

Further, polybisphenol A carbonate (bought from Sigma Alt Rich Japan Inc.) was prepared as an example of most usually used polycarbonate, and injection molding applied thereto to obtain solid-cylindrical samples (18 mm in diameter; 5 mm in length) for photoelasticity birefringence measurement, and photoelasticity birefringence was measured according to a measurement method similar to the foresaid method. Results are shown by points of ■-plotting in FIG. 7b.

A value of photoelasticity constant $81.78 \times 10^{-12}$ ($Pa^{-1}$) was obtained from this measurement. It is noted that photoelasticity constant is expressed in "$\times 10^{-12}(Pa^{-1})$", which is originated from a fact that there is the following relation between this unit and an old other unit Brewster used long time; Brewster.

$$1 Brewster = 1 \times 10^{-12} (Pa^{-1})$$

TABLE 5

| Photoelasticity birefringence of P(MMA/3FMA)/BzNA) | |
|---|---|
| OPTICAL RESIN | PHOTOELASTICITY CONSTANT ($Pa^{-1}$) |
| P(MMA/3FMA/BzMA = 55.5/38.0/6.5 | $0.119 \times 10^{-12}$ |
| PMMA | $-4.225 \times 10^{-12}$ |

These results shown by FIGS. 7a, 7b and Table 4 proved that this Embodiment is capable of providing polymer both orientation birefringence and photoelasticity birefringence of which are so small that they can be regarded as almost 0 in usual usages.

It was proved that much smaller absolute values of photoelasticity constants were obtained as compared with a small photoelasticity constant absolute value given by PMMA.

Producing optical members, formed of optical resin materials produced as above, having optional dimensions and optional shapes, by utilizing well-known manufacturing processes, non-birefringent optical members are obtained without needs of applying additional processes for avoiding orientation or for removing distortion as described in explanation of prior arts.

For example, if produced are substrate parts of light transmitting sheets or prism sheets for liquid crystal display by applying drawing, photoelasticity birefringence hardly appears under any external force (such as compressing stress or bending stress) acting when the member is mounted to a liquid crystal display. Orientation birefringence also hardly appears.

In addition, for instance, if produced are lenses arranged in signal reading optical system of optical disk devices by applying injection molding with the use of a mold, photoelasticity birefringence hardly appears under any external force (such as compressing stress or bending stress) acting when they are mounted to a signal reading optical system, without needs of applying additional processes for avoiding orientation or for removing distortion as described in explanation of prior arts. Orientation birefringence also hardly appears.

Further, even if extruding is applied to obtain optical members of optional shapes, both orientation birefringence and photoelasticity birefringence hardly appear under employment of a resin both orientation birefringence and photoelasticity birefringence of which are deadened together according to the methods described above. Such advantage is not obtained by optical resin materials of prior arts.

Summarizing the discussion described already, orientation birefringence tends to be generated during producing processes of optical members and the generated orientation birefringence remains after they are set.

Further, photoelasticity birefringence is generated in two cases, namely, being generated during cooling process from melting state and being generated by receiving any external force during being used as optical members after being cooled, and birefringence generated in both cases has been hardly eliminated together although only one of orientation birefringence and photoelasticity birefringence can be cancelled by prior arts, with the result that either orientation birefringence or photoelasticity birefringence remains in many cases.

To the contrary, optical resin materials provided by the present invention enables optical members showing almost no orientation birefringence and almost no photoelasticity birefringence to be produced at a high efficiency under employments known producing methods. Therefore, needless to say that performance of these optical members is higher as compared with that of those firmed of conventional optical resins.

Figure 8:
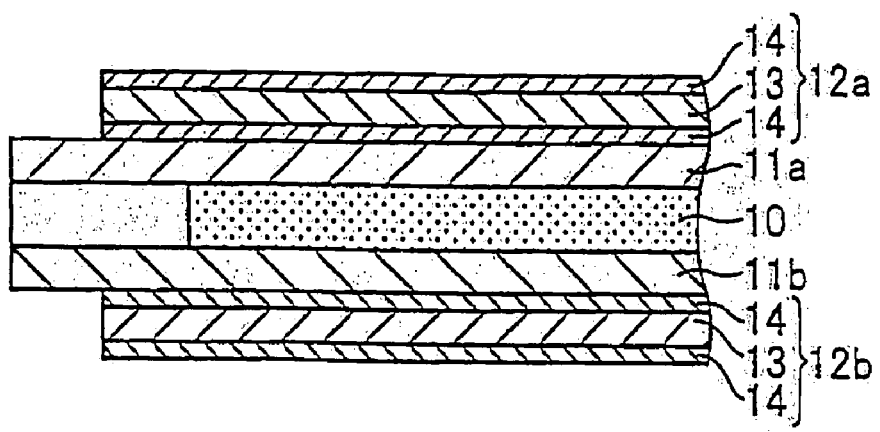
Figure 9:
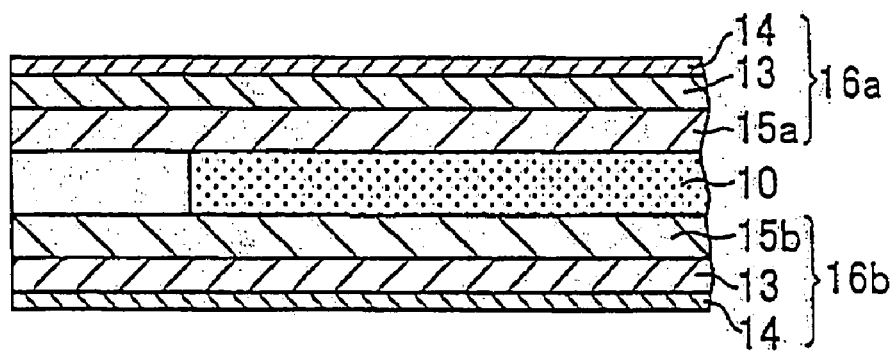

Finally, described by referring to FIGS. 8 and 9 are liquid crystal display elements employing optical resin sheets which a non-birefringent optical resin material in accordance with the present invention is applied, as an example of optical member, the resin sheets being interposed between a liquid crystal layer and a polarizing plate.

In FIG. 8, a liquid crystal layer is designated by numeral 10, being sealed between substrate 11a and 11b.

A pair of polarizing plate units 12a and 12b are disposed on both sides of substrates 11a and 11b. Each of polarizing plate units 12a and 12b is structured so that a polarizing plate 13 is sandwiched by resin sheets 14.

Resin sheets 14 can be made of a material such as one obtained in Embodiment 1 or 2. Resin sheets 14 protect polarizing plate 13 and enable light transmission without beam separation due to birefringence, regardless of receiving any external force (such as compression stress or bending stress). caused by birefringence.

FIG. 9 is a cross section view showing another application example of resin sheets. a liquid crystal layer is designated by numeral 10, being sealed between substrates 15a and 15b.

A pair of polarizing plate units 16a and 16b are disposed on both sides of substrates 15a and 15b. Each of polarizing plate units 16a and 16b is structured so that a polarizing plate 13 is covered by resin sheet 14 from the outside.

Resin sheets 14 can be made of a material such as one obtained in Embodiment 1 or 2. Resin sheets 14 can be made of a material such as one obtained in Embodiment 1 or 2. Resin sheets 14 protect polarizing plate 13 and enable light transmission without beam separation due to birefringence, regardless of receiving any external force (such as compression stress or bending stress).

Needless to give particular explanation, the present invention can be applied to not only such resin sheets but to other optical members employed in various optical devices, wherein the optical member may be film-like, plate-like, lens-like or members of other shapes (for example, various kinds of substrate, prism sheet, lens arranged in signal reading system of optical disk device, fresnel lens or lenticular lens or the like for projection screen, or lenticular lens).

The invention claimed is:

1. A non-birefringent optical resin material containing a composite constituent system of constituent number z not smaller than 3 under definition of constituent number, such that monomer-element number x ($x \geqq 2$) of a copolymer is included in constituent number z, wherein said composite constituent system consists of either only a copolymerization system(s) of monomer-element number x not smaller than 3 or both a copolymer of monomer-element number x not smaller than 2 and at least one low molecular-weight organic compound which has an anisotropic polarizability and is capable of being orientated in a polymer;

a combination of constituents composing said composite constituent system are set so that at least one of respective signs of characteristic orientation birefringence of respective homopolymers corresponding to respective monomers providing respective components of said copolymer, and a common sign of orientation birefringence shown by said low molecular-weight organic compound in said respective homopolymers is different from the other signs of orientation birefringence, and further so that at least one of respective signs of photoelasticity birefringence of said respective homopolymers and a common sign of photoelasticity birefringence shown by said low molecular-weight organic compound in said respective homopolymers is different from the other signs of photoelasticity birefringence; and a constituent ratio of constituents composing said composite constituent system are set so that said non-birefringent optical resin material has orientation birefringence and photoelasticity birefringence both of which are respectively deadened due to different-sign relations about said orientation birefringence and said photoelasticity birefringence, thereby rendering said characteristic orientation birefringence provided with an absolute value not greater then $6.7 \times 10^{-2}$ and also rendering said photoelasticity birefringence provided with an absolute value not greater than $5.0 \times 10^{-11}$ ($Pa^{-1}$).

2. A non-birefringent optical resin material according to claim 1, wherein at least one of the constituents composing said composite constituent system is a low molecular-weight organic compound.

3. A non-birefringent optical resin material according to claim 1, wherein said composite constituent system consists of only a copolymerization system(s) of monomer-element number not smaller than 3.

4. An optical member formed of a molded optical resin material, wherein said optical resin material is a non-birefringent optical resin material according to claim 1.

5. An optical member formed of a molded optical resin material, wherein said optical resin material is a non-birefringent optical resin material according to claim 2.

6. An optical member formed of a molded optical resin material, wherein said optical resin material is a non-birefringent optical resin material according to claim 3.

* * * * *

UNITED STATES PATENT AND TRADEMARK OFFICE
CERTIFICATE OF CORRECTION

Page 1 of 2

PATENT NO. : 7,842,740 B2
APPLICATION NO. : 11/919387
DATED : November 30, 2010
INVENTOR(S) : Yasuhiro Koike It is certified that error appears in the above-identified patent and that said Letters Patent is hereby corrected as shown below:

Drawing Sheet 4 of 8 (Below "0.05") (Fig. 5a), Line 1 delete "DEGEREE" and insert -- DEGREE --, therefor.

Drawing Sheet 6 of 8 (Below "0.05") (Fig. 7a), Line 1 delete "DEGEREE" and insert -- DEGREE --, therefor.

Drawing Sheet 8 of 8 (Fig. 10), Line 1 delete "SOILID-SYLINDRICAL" and insert -- SOLID-CYLINDRICAL --, therefor.

Column 2, Line 2 delete "normal," and insert -- normal --, therefor.

Column 2, Line 14 delete "points," and insert -- points. --, therefor.

Column 3, Line 42 delete "methacrylate," and insert -- methacrylate. --, therefor.

Column 5, Lines 37-38 after "birefringence"" insert -- . --.

Column 6, Line 27 delete "bot" and insert -- both --, therefor.

Column 10, Line 48 delete "copolymer 1)" and insert -- (copolymer 1) --, therefor.

Column 10, Line 67 delete "C" and insert -- $C_{MI}$ --, therefor.

Column 11, Line 38 delete "(1);" and insert -- (11); --, therefor.

Column 13, Line 52 delete "$\Delta n_{CP2E}=D_{CP2} \times C_{M1}+ECP2$" and insert -- $\Delta n_{CP2E}=D_{CP2} \times C_{M1}+E_{CP2}$ --, therefor.

Column 15, Line 13 delete "++" and insert -- + . . . + --, therefor.

Signed and Sealed this
Twenty-seventh Day of September, 2011

David J. Kappos
*Director of the United States Patent and Trademark Office*

CERTIFICATE OF CORRECTION (continued)
U.S. Pat. No. 7,842,740 B2

Column 15, Line 54 after "not" delete "means" and insert -- mean --, therefor.

Column 15, Line 55 delete "boeing" and insert -- being --, therefor.

Column 16, Line 60 delete "set's" and insert -- sets --, therefor.

Column 17, Line 34 delete" $C_M1=0.$" and insert -- $C_{M1}=0.$ --, therefor.

Column 18, Line 52 delete "means" and insert -- mean --, therefor.

Column 20, Line 67 before "in" insert -- 0.30 --.

Column 21, Line 21, after "and" insert -- 5 --.

Column 27, Line 48 delete "sheets." and insert -- sheets --, therefor.